United States Patent
Wakizaka et al.

(10) Patent No.: US 11,613,098 B2
(45) Date of Patent: Mar. 28, 2023

(54) LAMINATE FOR NON-AQUEOUS SECONDARY BATTERY AND METHOD OF PRODUCING SAME, ROLL FOR NON-AQUEOUS SECONDARY BATTERY, AND METHOD OF PRODUCING NON-AQUEOUS SECONDARY BATTERY COMPONENT

(71) Applicant: ZEON CORPORATION, Tokyo (JP)

(72) Inventors: Yasuhiro Wakizaka, Tokyo (JP); Masanobu Sato, Tokyo (JP); Hiroshi Koga, Tokyo (JP); Kouichirou Maeda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 449 days.

(21) Appl. No.: 16/638,748

(22) PCT Filed: Aug. 14, 2018

(86) PCT No.: PCT/JP2018/030302
§ 371 (c)(1),
(2) Date: Feb. 13, 2020

(87) PCT Pub. No.: WO2019/039357
PCT Pub. Date: Feb. 28, 2019

(65) Prior Publication Data
US 2020/0331234 A1    Oct. 22, 2020

(30) Foreign Application Priority Data
Aug. 21, 2017 (JP) .............................. JP2017-158567

(51) Int. Cl.
*B32B 7/06* (2019.01)
*H01M 4/139* (2010.01)
(Continued)

(52) U.S. Cl.
CPC .................. *B32B 7/06* (2013.01); *B32B 3/14* (2013.01); *B32B 25/08* (2013.01); *B32B 25/16* (2013.01);
(Continued)

(58) Field of Classification Search
CPC .. B32B 7/06; B32B 3/14; B32B 25/16; B32B 25/08; B32B 27/36; B32B 37/025; B32B 37/10; B32B 37/182
(Continued)

(56) References Cited

U.S. PATENT DOCUMENTS 5,843,549 A * 12/1998 Mingus ..................... B32B 7/06
428/218
2014/0079872 A1* 3/2014 Uchida ............. H01M 10/0525
427/58
(Continued)

FOREIGN PATENT DOCUMENTS

| CN | 105684190 A | 6/2016 |
| CN | 106575735 A | 4/2017 |

(Continued)

OTHER PUBLICATIONS

Machine_English_translation_WO_2015060698a1; Chen, S; et. al.; Method for Applying Adhesive Binder to Separation Membrane; Apr. 30, 2015; EPO; whole document (Year: 2015).*
(Continued)

*Primary Examiner* — Tahseen Khan
(74) *Attorney, Agent, or Firm* — Kenja IP Law PC

(57) ABSTRACT

Provided is a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery. The laminate for
(Continued)

a non-aqueous secondary battery includes a releasable substrate and a functional layer containing a binder. The functional layer is formed in a dotted form on a surface A at one side of the releasable substrate.

3 Claims, 2 Drawing Sheets

(51) Int. Cl.
  *B32B 3/14* (2006.01)
  *B32B 25/08* (2006.01)
  *B32B 25/16* (2006.01)
  *B32B 27/36* (2006.01)
  *B32B 37/00* (2006.01)
  *B32B 37/10* (2006.01)
  *B32B 37/18* (2006.01)
  *H01M 4/04* (2006.01)
  *H01M 4/62* (2006.01)
  *H01M 10/0525* (2010.01)
  *H01M 10/0587* (2010.01)
  *H01M 50/449* (2021.01)
  *H01M 50/463* (2021.01)

(52) U.S. Cl.
  CPC .......... *B32B 27/36* (2013.01); *B32B 37/025* (2013.01); *B32B 37/10* (2013.01); *B32B 37/182* (2013.01); *H01M 4/0435* (2013.01); *H01M 4/139* (2013.01); *H01M 4/622* (2013.01); *H01M 10/0525* (2013.01); *H01M 10/0587* (2013.01); *H01M 50/449* (2021.01); *H01M 50/463* (2021.01); *B32B 2307/206* (2013.01); *B32B 2319/00* (2013.01); *B32B 2367/00* (2013.01); *B32B 2457/10* (2013.01)

(58) Field of Classification Search
  USPC ........................................................ 156/239
  See application file for complete search history.

(56) References Cited

U.S. PATENT DOCUMENTS

| 2015/0044417 | A1* | 2/2015 | Koike | B29C 33/3857 |
| | | | | 264/447 |
| 2015/0140397 | A1* | 5/2015 | Tajima | B32B 27/32 |
| | | | | 429/127 |
| 2015/0158268 | A1* | 6/2015 | Koike | B32B 3/30 |
| | | | | 156/247 |
| 2017/0214022 | A1* | 7/2017 | Sasaki | H01M 50/411 |
| 2017/0239919 | A1* | 8/2017 | Miyagoe | B32B 17/10036 |
| 2017/0279090 | A1* | 9/2017 | Amano | B32B 27/34 |
| 2021/0036375 | A1* | 2/2021 | Sato | H01M 10/0585 |
| 2022/0231378 | A1* | 7/2022 | Annaka | H01G 11/52 |

FOREIGN PATENT DOCUMENTS

| JP | 2012204303 A | | 10/2012 | | |
| JP | 2013145763 A | | 7/2013 | | |
| JP | 2015207547 A | | 11/2015 | | |
| JP | 2017500688 A | | 1/2017 | | |
| JP | 2017103031 A | | 6/2017 | | |
| JP | 2017103034 A | * | 6/2017 | | |
| JP | 2017103034 A | | 6/2017 | | |
| JP | 2018085347 A | | 5/2018 | | |
| WO | WO-2015060698 A1 | * | 4/2015 | ............... | C08J 5/22 |
| WO | 2016031163 A1 | | 3/2016 | | |
| WO | WO-2016031163 A1 | * | 3/2016 | ........ | H01M 10/0525 |

OTHER PUBLICATIONS

Machine_English_translation_JP_2017103034_A; Akiike, J.; Method for Forming Functional Layer for Non-Aqueous Secondary Battery, and Method for Manufacturing Nonaqueous Secondary Battery; Jun. 8, 2017; EPO; whole document (Year: 2017).*
Feb. 25, 2020, International Preliminary Report on Patentability issued in the International Patent Application No. PCT/JP2018/030302.
Sep. 18, 2018, International Search Report issued in the International Patent Application No. PCT/JP2018/030302.
May 11, 2021, the Extended European Search Report issued by the European Patent Office in the corresponding European Patent Application No. 18847946.3.

* cited by examiner

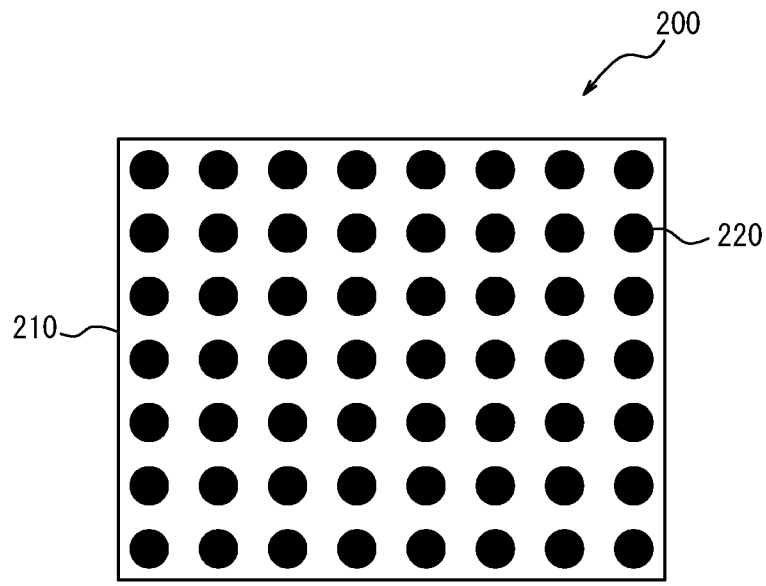
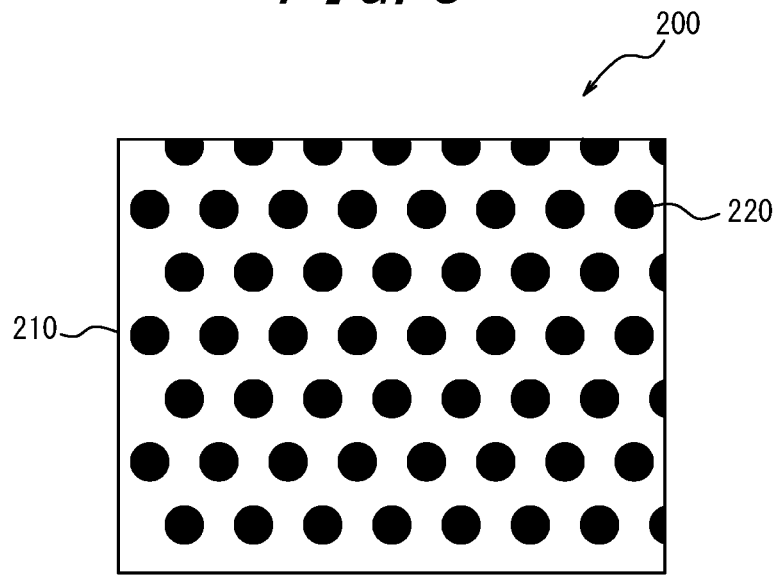

LAMINATE FOR NON-AQUEOUS SECONDARY BATTERY AND METHOD OF PRODUCING SAME, ROLL FOR NON-AQUEOUS SECONDARY BATTERY, AND METHOD OF PRODUCING NON-AQUEOUS SECONDARY BATTERY COMPONENT

TECHNICAL FIELD

The present disclosure relates to a laminate for a non-aqueous secondary battery and a method of producing the same, a roll for a non-aqueous secondary battery, and a method of producing a non-aqueous secondary battery component. More specifically, the present disclosure relates to a laminate for a non-aqueous secondary battery including a functional layer on a releasable substrate and a method of producing the same, a roll for a non-aqueous secondary battery obtained by winding a laminate for a non-aqueous secondary battery, and a method of producing a non-aqueous secondary battery component by transferring a functional layer of a laminate for a non-aqueous secondary battery onto a substrate for a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes non-aqueous secondary battery components (hereinafter, also referred to simply as "battery components") such as a positive electrode, a negative electrode, and a separator that isolates the positive electrode and the negative electrode from one another and prevents short circuiting between the positive and negative electrodes.

In recent years, battery components that include a functional layer (for example, a porous membrane layer aimed at improving heat resistance or strength or an adhesive layer aimed at improving adhesiveness) on a substrate for a non-aqueous secondary battery (for example, an electrode substrate or a separator substrate) have been used as battery components. More specific examples thereof include an electrode in which a functional layer is further formed on an electrode substrate including an electrode mixed material layer on a current collector and a separator in which a functional layer is formed on a separator substrate.

One method that is being studied for production of battery components including functional layers is a method in which a functional layer is temporarily provided on a releasable substrate to obtain a laminate for a non-aqueous secondary battery, the laminate for a secondary battery is then pasted together with a substrate for a non-aqueous secondary battery, and the functional layer is transferred onto the substrate for a secondary battery (for example, refer to Patent Literature (PTL) 1).

PTL 1 discloses a laminate for a secondary battery that includes a releasable substrate having a contact angle with water of 70° or more and a functional layer disposed on the releasable substrate, adjacently thereto, and in which the functional layer contains a binder and organic particles having a specific core-shell structure. According to PTL 1, the amount of the functional layer that remains on the releasable substrate after transfer can be reduced through the contact angle with water of the releasable substrate being 70° or more while also improving battery characteristics (for example, low-temperature output characteristics) of a secondary battery through the contribution of the organic particles having a specific core-shell structure.

CITATION LIST

Patent Literature

PTL 1: WO 2016/031163 A1

SUMMARY

Technical Problem

With respect to the conventional laminate for a secondary battery described above, there was demand for further reducing the amount of the functional layer that remains on the releasable substrate after transfer while, on the other hand, sufficiently adhering the functional layer to a substrate for a secondary battery that is a transfer destination. However, there is a problem that reducing the amount of binder, for example, in order to further facilitate peeling of the functional layer from the releasable substrate also results in loss of adhesiveness to a substrate for a secondary battery that is a transfer destination.

Moreover, when a functional layer containing a binder is provided at the surface of a battery component, the functional layer is required to display sufficient binding capacity and enable strong close adherence between battery components.

Therefore, there is room for further improvement of the conventional technique described above in terms of enabling a balance of high levels of peelability of a functional layer from a releasable substrate and adhesiveness of the functional layer to a substrate for a secondary battery during production of a battery component, such as an electrode or a separator, through transfer of the functional layer onto the substrate for a secondary battery from a laminate for a secondary battery, while also enabling sufficient close adherence, via the functional layer, between the battery component obtained through transfer of the functional layer and another battery component.

Accordingly, an objective of the present disclosure is to provide a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery, and also to provide a roll for a non-aqueous secondary battery obtained by winding this laminate for a non-aqueous secondary battery.

Another objective of the present disclosure is to provide a method of producing a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery.

Yet another objective of the present disclosure is to provide a method that enables good transfer of a functional layer onto a substrate for a non-aqueous secondary battery from a laminate for a non-aqueous secondary battery to produce a non-aqueous secondary battery component capable of sufficient close adherence to another battery component.

Solution to Problem

The inventors conducted diligent investigation with the aim of solving the problems set forth above. The inventors discovered that by using a laminate for a secondary battery in which a functional layer containing a binder is formed in a dotted form at the surface of a releasable substrate, the functional layer can easily be peeled from the releasable substrate while, on the other hand, being well adhered to a substrate for a secondary battery during production of a battery component through transfer of the functional layer onto the substrate for a secondary battery, and that the functional layer transferred from the laminate for a secondary battery enables sufficient close adherence between battery components. In this manner, the inventors completed the present disclosure.

Specifically, the present disclosure aims to advantageously solve the problems set forth above by disclosing a laminate for a non-aqueous secondary battery comprising: a releasable substrate; and a functional layer containing a binder, wherein the functional layer is formed in a dotted form on a surface A at one side of the releasable substrate. By performing functional layer transfer to a substrate for a secondary battery from a laminate for a secondary battery in which a functional layer containing a binder is formed in a dotted form on the surface of a releasable substrate as set forth above, the functional layer can easily be peeled from the releasable substrate while also being well adhered to the substrate for a secondary battery.

When a functional layer is said to be "formed in a dotted form" on the surface of a releasable substrate or the like in the present disclosure, this means that the functional layer is disposed on the surface as dots of any shape that are non-continuous.

In the presently disclosed laminate for a non-aqueous secondary battery, the surface A preferably has a smaller contact angle with water than a surface B at an opposite side of the releasable substrate to the surface A. In a situation in which the laminate for a secondary battery is wound up as a roll for a secondary battery for storage, transport, or the like, excessive adhesion to the surface B of the functional layer that is formed on the surface A prior to winding can be inhibited, and thus blocking can be inhibited (i.e., blocking resistance when the laminate for a secondary battery is in the form of a roll for a secondary battery can be improved) through the contact angle with water of the surface A of the releasable substrate, which is in contact with the functional layer, being smaller than the contact angle with water of the surface B, which is the surface at the reverse side of the surface A.

The "contact angle with water" referred to in the present disclosure can be measured by a method described in the EXAMPLES section of the present specification.

In the presently disclosed laminate for a non-aqueous secondary battery, the surface B at the opposite side of the releasable substrate to the surface A preferably has a contact angle with water of 90° or more. When the contact angle with water of the surface B is 90° or more, blocking resistance when the laminate for a non-aqueous secondary battery is in the form of a roll for a secondary battery can be improved.

The present disclosure also aims to advantageously solve the problems set forth above by disclosing a roll for a non-aqueous secondary battery obtained by winding any one of the laminates for a non-aqueous secondary battery set forth above. By winding the laminate for a secondary battery into the form of a roll for a secondary battery, the laminate for a secondary battery is placed in a form that is suitable for transport or storage. Moreover, when the laminate for a non-aqueous secondary battery is fed from the presently disclosed roll for a secondary battery and is used for functional layer transfer onto a substrate for a secondary battery, the functional layer can easily be peeled from the releasable substrate while also being well adhered to the substrate for a secondary battery.

The present disclosure also aims to advantageously solve the problems set forth above by disclosing a method of producing a non-aqueous secondary battery component including a functional layer on a substrate for a non-aqueous secondary battery, comprising: positioning any one of the laminates for a non-aqueous secondary battery set forth above such that the functional layer is adjacent to the substrate for a non-aqueous secondary battery and adhering the functional layer to the substrate for a non-aqueous secondary battery; and peeling the functional layer from the releasable substrate. By performing functional layer transfer to a substrate for a secondary battery from any one of the laminates for a secondary battery set forth above in this manner, the functional layer can easily be peeled from the releasable substrate while also being well adhered to the substrate for a secondary battery. Moreover, by producing a battery component including a functional layer through functional layer transfer to a substrate for a secondary battery from any one of the laminates for a secondary battery set forth above, sufficient close adherence of battery components via the functional layer can be achieved.

The present disclosure also aims to advantageously solve the problems set forth above by disclosing a method of producing a laminate for a non-aqueous secondary battery including a releasable substrate and a functional layer containing a binder, comprising: supplying a composition for a non-aqueous secondary battery functional layer containing the binder and a solvent onto a surface A at one side of the releasable substrate; and drying the composition for a non-aqueous secondary battery functional layer that has been supplied onto the surface A, wherein the surface A has a contact angle with water of 60° or more, and a supplied amount of the composition for a non-aqueous secondary battery functional layer to the surface A per unit area is, in terms of solid content, not less than 0.05 g/m$^2$ and less than 0.8 g/m$^2$. Through the steps set forth above, it is possible to produce a laminate for a secondary battery in which a functional layer containing a binder is formed in a dotted form at the surface of a releasable substrate. Moreover, by performing functional layer transfer to a substrate for a secondary battery from a laminate for a secondary battery in which a functional layer containing a binder is formed in a dotted form at the surface of a releasable substrate as set forth above, the functional layer can easily be peeled from the releasable substrate while also being well adhered to the substrate for a secondary battery.

Advantageous Effect

According to the present disclosure, it is possible to provide a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery, and also to provide a roll for a non-aqueous secondary battery obtained by winding this laminate for a non-aqueous secondary battery.

Moreover, according to the present disclosure, it is possible to provide a method of producing a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery.

Furthermore, according to the present disclosure, it is possible to provide a method that enables good transfer of a functional layer onto a substrate for a non-aqueous secondary battery from a laminate for a non-aqueous secondary battery to produce a non-aqueous secondary battery component that is capable of sufficient close adherence to another battery component.

BRIEF DESCRIPTION OF THE DRAWINGS

In the accompanying drawings:

FIG. 2 is a plan view schematically illustrating one example of a presently disclosed laminate for a non-aqueous secondary battery; and FIG. 3 is a plan view schematically illustrating another example of a presently disclosed laminate for a non-aqueous secondary battery.

DETAILED DESCRIPTION

Figure 1:
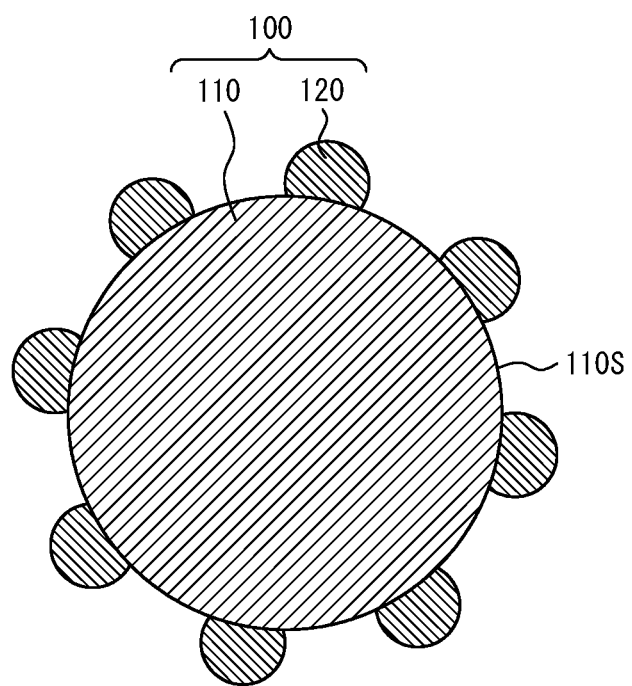
FIG. 1 is a cross-sectional view schematically illustrating the structure of one example of an organic particle that is optionally contained in a functional layer of a presently disclosed laminate for a non-aqueous secondary battery.

The following provides a detailed description of embodiments of the present disclosure.

The presently disclosed laminate for a non-aqueous secondary battery is used in order to transfer a functional layer onto a substrate for a non-aqueous battery so as to produce a non-aqueous secondary battery component including the functional layer. Moreover, the presently disclosed roll for a non-aqueous secondary battery is obtained by winding the presently disclosed laminate for a non-aqueous secondary battery. Also, the presently disclosed laminate for a non-aqueous secondary battery can be produced, for example, by the presently disclosed method of producing a laminate for a non-aqueous secondary battery. Furthermore, the presently disclosed method of producing a non-aqueous secondary battery component is a method of producing a non-aqueous secondary battery component including a functional layer and a substrate for a non-aqueous secondary battery using the presently disclosed laminate for a non-aqueous secondary battery.

Note that "functional layer" may refer to a porous membrane layer that is mainly for improving heat resistance and strength of a secondary battery component such as a separator or an electrode, an adhesive layer that is for adhering secondary battery components to one another, or a layer that displays functions of both a porous membrane layer and an adhesive layer.

(Laminate for Non-Aqueous Secondary Battery)

The presently disclosed laminate for a secondary battery includes a releasable substrate and a functional layer containing at least a binder that is formed in a dotted form on a surface A at one side of the releasable substrate.

By using the presently disclosed laminate for a secondary battery to perform functional layer transfer onto a substrate for a secondary battery, the functional layer can easily be peeled from the releasable substrate while also being sufficiently adhered to the substrate for a secondary battery during transfer to enable efficient battery component production. Moreover, by producing a battery component including a functional layer through functional layer transfer to a substrate for a secondary battery from the presently disclosed laminate for a secondary battery, sufficient close adherence of battery components via the functional layer can be achieved.

Although it is not certain why a balance of high levels of peelability of a functional layer from a releasable substrate and adhesiveness of the functional layer to a substrate for a secondary battery can be achieved and why sufficient close adherence of battery components through the functional layer after transfer can also be achieved when the presently disclosed laminate for a secondary battery is used in transfer of the functional layer onto the substrate for a secondary battery, the reasons for this are presumed to be as follows.

Firstly, in a situation in which a functional layer is transferred onto a substrate for a secondary battery from a conventional laminate for a secondary battery including a functional layer that is formed continuously and uniformly on a releasable substrate, there are instances in which if just a small part of the functional layer is strongly affixed to the releasable substrate due to unevenness of pressure (transfer pressure) applied during transfer, for example, a section of the functional layer in proximity to the strongly affixed part ends up remaining on the releasable substrate. In contrast, when functional layer transfer onto a substrate for a secondary battery is performed using the presently disclosed laminate for a secondary battery including a functional layer that is formed in a dotted form on a releasable substrate, even if a small number of the dots were to be strongly affixed to the releasable substrate, other dots in proximity thereto would not remain on the releasable substrate in the same way as when the conventional laminate for a secondary battery is used because the strongly affixed dots are independent from the other dots, and thus peelability of the functional layer from the releasable substrate can be sufficiently increased. On the other hand, as a result of the functional layer being formed in a dotted form on the releasable substrate in the presently disclosed laminate for a secondary battery, transfer pressure concentrates in each of the dots, which enables strong adhesion of the functional layer to a substrate for a secondary battery that is a transfer destination thereof. It is thought that for these reasons, in production of a battery component through transfer of a functional layer to a component for a secondary battery, a balance of high levels of peelability of the functional layer from a releasable substrate and adhesiveness of the functional layer to a substrate for a secondary battery can be achieved by using the presently disclosed laminate for a secondary battery.

Moreover, when a functional layer that is formed in a dotted form on a releasable substrate is transferred to a substrate for a secondary battery so as to produce a battery component, if irregularities are present at the surface of the substrate for a secondary battery, a large number of dots can be provided at raised sections of the surface as compared to when a dotted functional layer is directly formed on the substrate for a secondary battery by supplying a composition for a functional layer onto the substrate for a secondary battery and then drying the composition for a functional layer, for example. A battery component having a large number of dots containing a binder disposed at raised sections on the surface thereof in this manner can be in contact with an adjacent battery component with a larger number of dots as contact points compared to a battery component having dots containing a binder disposed uniformly over a surface, inclusive of depressed sections. It is thought that for this reason, sufficient close adherence of battery components via a functional layer can be achieved by producing a battery component including a functional layer through functional layer transfer to a substrate for a secondary battery from the presently disclosed laminate for a secondary battery.

Note that by using the presently disclosed laminate for a secondary battery to transfer a functional layer onto a substrate for a secondary battery, it is possible to obtain a battery component including a functional layer that is formed in a dotted form on the surface of the substrate for a secondary battery. When a battery component including a functional layer that is formed in a dotted form is used to produce a secondary battery, sufficient diffusivity of metal ions (lithium ions, etc.) as charge carriers is ensured even when the binder in the functional layer swells in electrolyte solution. Ensuring sufficient diffusivity of metal ions as charge carriers in this manner is presumed to be the reason that deposition of metal originating from metal ions on an electrode (particularly a negative electrode) can be inhibited through the use of a battery component including a functional layer that is formed in a dotted form.

<Functional Layer>

The functional layer of the laminate for a secondary battery contains a binder as previously described and may optionally contain organic particles, non-conductive particles (excluding those corresponding to the organic particles and the binder), and other components. The functional layer is transferred onto a substrate for a secondary battery, such as a separator substrate or an electrode substrate, from the laminate for a secondary battery, and thus constitutes part of a battery component, such as a separator or an electrode.

<<Binder>>

The binder can function as a component that, in a functional layer included in a battery component after the functional layer has been transferred onto a substrate for a secondary battery, adheres battery components to one another and inhibits detachment from the functional layer of components contained in the functional layer.

The binder contained in the functional layer may, for example, be a conjugated diene polymer or an acrylic polymer, but is not specifically limited thereto.

One binder may be used individually, or two or more binders may be used in combination.

[Conjugated Diene Polymer]

The term "conjugated diene polymer" refers to a polymer that includes a conjugated diene monomer unit (inclusive of a hydrogenated unit thereof). The proportion in which the conjugated diene monomer unit is included in the conjugated diene polymer when all repeating units (all monomer units) in the conjugated diene polymer are taken to be 100 mass % may, for example, be set as not less than 30 mass % and not more than 100 mass %, may be set as not less than 50 mass % and not more than 100 mass %, or may be set as not less than 70 mass % and not more than 100 mass %.

Specific examples of the conjugated diene polymer include, but are not specifically limited to, aliphatic conjugated diene polymers such as polybutadiene and polyisoprene; aromatic vinyl-aliphatic conjugated diene copolymers such as a styrene-butadiene polymer (SBR); vinyl cyanide-conjugated diene copolymers such as an acrylonitrile-butadiene polymer (NBR); hydrogenated SBR; and hydrogenated NBR. Of these conjugated diene polymers, aliphatic conjugated diene polymers are preferable, and polybutadiene is more preferable from a viewpoint of further improving peelability of the functional layer from the releasable substrate.

The phrase "includes a monomer unit" as used with respect to a polymer in the present disclosure means that "a polymer obtained with the monomer includes a repeating unit derived from the monomer". The proportion in which a polymer includes each monomer unit can be measured by a nuclear magnetic resonance (NMR) method such as $^1$H-NMR or $^{13}$C-NMR.

Although either solid polybutadiene or liquid polybutadiene may be used as polybutadiene, the use of both solid polybutadiene and liquid polybutadiene is preferable from a viewpoint of achieving a balance of even higher levels of peelability of the functional layer from the releasable substrate and adhesiveness of the functional layer to a substrate for a secondary battery in production of a battery component through transfer of the functional layer onto the substrate for a secondary battery. In other words, the functional layer preferably contains a mixture of solid polybutadiene and liquid polybutadiene as the binder.

In a case in which solid polybutadiene and liquid polybutadiene are used together as the binder, the content of the solid polybutadiene in the functional layer is preferably 40 mass % or more, more preferably 55 mass % or more, and even more preferably 70 mass % or more of the total content of the solid polybutadiene and the liquid polybutadiene, and is preferably 95 mass % or less, more preferably 90 mass % or less, and even more preferably 85 mass % or less of the total content of the solid polybutadiene and the liquid polybutadiene. Peelability of the functional layer from the releasable substrate during transfer can be further improved when the content of the solid polybutadiene constitutes 40 mass % or more of the total content of the solid polybutadiene and the liquid polybutadiene, whereas adhesiveness of the functional layer to a substrate for a secondary battery during transfer can be further improved when the content of the solid polybutadiene constitutes 95 mass % or less of the total content of the solid polybutadiene and the liquid polybutadiene.

In the present disclosure, "solid polybutadiene" refers to polybutadiene that is in a solid state under conditions of a temperature of 25° C. and an air pressure of 1 atm, whereas "liquid polybutadiene" refers to polybutadiene that is in a liquid state under conditions of a temperature of 25° C. and an air pressure of 1 atm.

[Acrylic Polymer]

The acrylic polymer is a polymer that includes a (meth) acrylic acid ester monomer unit. In the present disclosure, "(meth)acryl" is used to indicate "acryl" and/or "methacryl".

The acrylic polymer referred to in the present disclosure is preferably a polymer that includes a (meth)acrylic acid ester monomer unit and a nitrile group-containing monomer unit, and that optionally includes other monomer units, but is not specifically limited thereto.

—(Meth)Acrylic Acid Ester Monomer Unit—

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One of these (meth)acrylic acid ester monomers may be used individually, or two or more of these (meth)acrylic acid ester monomers may be used in combination. Of these (meth) acrylic acid ester monomers, acrylic acid alkyl esters are preferable, and n-butyl acrylate and 2-ethylhexyl acrylate are particularly preferable.

The proportion in which the (meth)acrylic acid ester monomer unit is included in the acrylic polymer when the amount of all repeating units (all monomer units) in the acrylic polymer is taken to be 100 mass % is preferably 60 mass % or more, more preferably 65 mass % or more, and even more preferably 70 mass % or more, and is preferably 99 mass % or less, more preferably 98 mass % or less, and even more preferably 95 mass % or less. When the proportion constituted by the (meth)acrylic acid ester monomer unit in the acrylic polymer is 60 mass % or more, flexibility of the acrylic polymer is improved, and thus flex resistance of the laminate for a secondary battery including the functional layer is ensured. This can facilitate winding of the laminate for a secondary battery and enables efficient production of a roll for a secondary battery. On the other hand, when the proportion constituted by the (meth)acrylic acid ester monomer unit in the acrylic polymer is 99 mass % or less, the acrylic polymer is not excessively flexible, and transfer pressure can favorably concentrate in each dot during transfer, which enables further improvement of adhesiveness of the functional layer to a substrate for a secondary battery.

—Nitrile Group-Containing Monomer Unit—

Examples of nitrile group-containing monomers that can form the nitrile group-containing monomer unit include $\alpha,\beta$-ethylenically unsaturated nitrile monomers. Specifically, any $\alpha,\beta$-ethylenically unsaturated compound that has a nitrile group can be used as an $\alpha,\beta$-ethylenically unsaturated nitrile monomer without any specific limitations. Examples include acrylonitrile; $\alpha$-halogenoacrylonitriles such as $\alpha$-chloroacrylonitrile and $\alpha$-bromoacrylonitrile; and $\alpha$-alkylacrylonitriles such as methacrylonitrile and $\alpha$-ethylacrylonitrile. One of these $\alpha,\beta$-ethylenically unsaturated nitrile monomers may be used individually, or two or more of these $\alpha,\beta$-ethylenically unsaturated nitrile monomers may be used in combination. Of these $\alpha,\beta$-ethylenically unsaturated nitrile monomers, acrylonitrile is preferable.

The proportion in which the nitrile group-containing monomer unit is included in the acrylic polymer when the amount of all repeating units in the acrylic polymer is taken to be 100 mass % is preferably 0.1 mass % or more, more preferably 1 mass % or more, and even more preferably 1.5 mass % or more, and is preferably 20 mass % or less, more preferably 15 mass % or less, and even more preferably 10 mass % or less. Sufficient binding capacity of the acrylic polymer can be ensured when the proportion constituted by the nitrile group-containing monomer unit in the acrylic polymer is 0.1 mass % or more. Consequently, detachment of the functional layer from the releasable substrate prior to transfer can be sufficiently inhibited while also further improving adhesiveness of the functional layer to a substrate for a secondary battery during transfer. On the other hand, when the proportion constituted by the nitrile group-containing monomer unit in the acrylic polymer is 20 mass % or less, sufficient peelability of the functional layer from the releasable substrate during transfer can be ensured, and blocking resistance when the laminate for a secondary battery is in the form of a roll for a secondary battery can be improved.

—Other Monomer Units—

Examples of other monomer units that can be included in the acrylic polymer include, but are not specifically limited to, an acidic group-containing monomer unit and a cross-linkable monomer unit.

Examples of acidic group-containing monomers that can form the acidic group-containing monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, $\alpha$-acetoxyacrylic acid, $\beta$-trans-aryloxyacrylic acid, and $\alpha$-chloro-$\beta$-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can also be used as a carboxy group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, monocarboxylic acids are more preferable, and methacrylic acid is even more preferable.

The proportion in which the acidic group-containing monomer unit is included in the acrylic polymer when the amount of all repeating units in the acrylic polymer is taken to be 100 mass % is preferably 0.1 mass % or more, more preferably 1 mass % or more, and even more preferably 1.5 mass % or more, and is preferably 10 mass % or less, more preferably 7 mass % or less, and even more preferably 4 mass % or less.

Examples of cross-linkable monomers that can form the cross-linkable monomer unit include, but are not specifically limited to, monomers that can form a cross-linked structure through polymerization. A typical example of a cross-linkable monomer is a monomer that is thermally cross-linkable. More specific examples include a monofunctional monomer having a thermally cross-linkable group and one olefinic double bond per molecule, and a polyfunctional monomer having two or more olefinic double bonds per molecule.

Examples of thermally cross-linkable groups include an epoxy group, an N-methylol amide group, an oxetanyl group, an oxazoline group, and combinations thereof. Of these thermally cross-linkable groups, an epoxy group is more preferable in terms of ease of cross-linking and cross-link density adjustment.

Examples of cross-linkable monomers including an epoxy group as a thermally cross-linkable group and including an olefinic double bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of cross-linkable monomers including an N-methylol amide group as a thermally cross-linkable group and including an olefinic double bond include (meth)acrylamides that include a methylol group such as N-methylol (meth)acrylamide.

Examples of cross-linkable monomers including an oxetanyl group as a thermally cross-linkable group and including an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

In the present disclosure, "(meth)acryloyl" is used to indicate "acryloyl" and/or "methacryloyl".

Examples of cross-linkable monomers including an oxazoline group as a thermally cross-linkable group and including an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of cross-linkable monomers including two or more olefinic double bonds per molecule include allyl (meth)acrylate, ethylene di(meth)acrylate, diethylene glycol di(meth)acrylate, triethylene glycol di(meth)acrylate, tetraethylene glycol di(meth)acrylate, trimethylolpropane tri(meth)acrylate, dipropylene glycol diallyl ether, polyglycol diallyl ether, triethylene glycol divinyl ether, hydroquinone diallyl ether, tetraallyloxyethane, trimethylolpropane diallyl ether, allyl and vinyl ethers of polyfunctional alcohols other than the preceding examples, triallylamine, methylene bisacrylamide, and divinylbenzene.

In the present disclosure, "(meth)acrylate" is used to indicate "acrylate" and/or "methacrylate".

One of these cross-linkable monomers may be used individually, or two or more of these cross-linkable monomers may be used in combination.

Of these cross-linkable monomers, allyl glycidyl ether and N-methylolacrylamide are preferable.

The proportion in which the cross-linkable monomer unit is included in the acrylic polymer when the amount of all repeating units in the acrylic polymer is taken to be 100 mass % is preferably 0.1 mass % or more, more preferably 1 mass % or more, and even more preferably 1.5 mass % or more, and is preferably 10 mass % or less, more preferably 7 mass % or less, and even more preferably 4 mass % or less.

—Production Method of Binder—

No specific limitations are placed on the method by which the binder set forth above is produced. For example, a monomer composition containing one monomer or containing two or more monomers may be polymerized by a known method to produce a binder that is substantially composed of a single polymer component (i.e., that does not have the subsequently described core-shell structure).

The fractional content of each monomer in the monomer composition used in production of the binder can be set in accordance with the fractional content of each monomer unit in the polymer that is to be used as the binder.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

—Glass-Transition Temperature of Binder—

The glass-transition temperature of the polymer serving as the binder that is obtained as set forth above is not specifically limited but is preferably −120° C. or higher, more preferably −90° C. or higher, even more preferably −80° C. or higher, and particularly preferably −70° C. or higher, and is preferably −5° C. or lower, and more preferably −15° C. or lower. When the glass-transition temperature of the binder is −120° C. or higher, detachment of the functional layer from the releasable substrate prior to transfer can be sufficiently inhibited while also further improving adhesiveness of the functional layer to a substrate for a secondary battery during transfer. On the other hand, when the glass-transition temperature of the binder is −5° C. or lower, sufficient peelability of the functional layer from the releasable substrate during transfer can be ensured, and blocking resistance when the laminate for a secondary battery is in the form of a roll for a secondary battery can be improved.

In a case in which the functional layer contains the subsequently described organic particles, for example, the fractional content of the binder in the functional layer when the mass of the entire functional layer is taken to be 100 mass % is normally 3 mass % or more, preferably 5 mass % or more, and more preferably 10 mass % or more, and is normally 50 mass % or less, preferably 45 mass % or less, and more preferably 40 mass % or less.

<Organic Particles>

The organic particles that may optionally be contained in the functional layer are particles formed by a polymer and are a component that can, for example, improve a certain aspect of performance of the functional layer, such as strength, heat resistance, and/or adhesiveness in electrolyte solution. The organic particles preferably have a core-shell structure.

<<Core-Shell Structure>>

The organic particles having a core-shell structure are particles that have a core-shell structure including a core portion and a shell portion that covers an outer surface of the core portion. Although the shell portion may completely cover or partially cover the outer surface of the core portion, it is preferable that the shell portion partially covers the outer surface of the core portion. In other words, it is preferable that the shell portion of the organic particles covers the outer surface of the core portion but does not cover the entire outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Therefore, an organic particle in which fine pores are continuous between the outer surface of a shell portion (i.e., the circumferential surface of the organic particle) and the outer surface of a core portion is considered to be included among the preferable organic particles described above in which a shell portion partially covers the outer surface of a core portion.

Specifically, in the cross-sectional structure of one example of a preferable organic particle such as illustrated in FIG. 1, the organic particle 100 has a core-shell structure including a core portion 110 and a shell portion 120. The core portion 110 is a portion of the organic particle 100 that is located further inward than the shell portion 120. The shell portion 120 is a portion of the organic particle 100 that covers an outer surface 110S of the core portion 110 and is normally an outermost portion of the organic particle 100. In this example, the shell portion 120 partially covers the outer surface 110S of the core portion 110 and does not cover the entire outer surface 110S of the core portion 110.

The organic particles having a core-shell structure may include any elements other than the core portion and the shell portion described above so long as the expected effects are not significantly lost. Specifically, the organic particles may, for example, include a portion inside of the core portion that is formed from a different polymer to the core portion. In one specific example, a residual seed particle may be present inside of the core portion in a situation in which seed particles are used in production of the organic particles by seeded polymerization. However, from a viewpoint of more noticeably displaying the expected effects, it is preferable that the organic particles are composed by only the core portion and the shell portion.

[Core Portion]

A polymer that forms the core portion (core polymer) is not specifically limited but preferably includes either or both of a nitrile group-containing monomer unit and a (meth) acrylic acid ester monomer unit. However, note that the core polymer can include monomer units other than the (meth) acrylic acid ester monomer unit and the nitrile group-containing monomer unit (i.e., other monomer units).

—Nitrile Group-Containing Monomer Unit—

Examples of nitrile group-containing monomers that can form the nitrile group-containing monomer unit include that same nitrile group-containing monomers as previously described in the "Binder" section. One of these nitrile group-containing monomers may be used individually, or two or more of these nitrile group-containing monomers may be used in combination. Of these nitrile group-containing monomers, acrylonitrile and methacrylonitrile are preferable.

The proportion in which the nitrile group-containing monomer unit is included in the core polymer when the amount of all repeating units in the organic particles (total amount of repeating units (monomer units) in the core and shell polymers) is taken to be 100 mass % is preferably 15 mass % or more, and more preferably 20 mass % or more, and is preferably 50 mass % or less, and more preferably 45 mass % or less. When the proportion in which the nitrile group-containing monomer unit is included in the core polymer is 15 mass % or more with the amount of all repeating units in the organic particles taken to be 100 mass %, the strength of the organic particles can be increased, and a battery component obtained through transfer of the functional layer onto a substrate for a secondary battery can be closely adhered more strongly to another battery component via the functional layer.

—(Meth)Acrylic Acid Ester Monomer Unit—

Examples of (meth)acrylic acid ester monomers that can form the (meth)acrylic acid ester monomer unit include the same (meth)acrylic acid ester monomers as previously described in the "Binder" section. One of these (meth) acrylic acid ester monomers may be used individually, or two or more of these (meth)acrylic acid ester monomers may be used in combination. Of these (meth)acrylic acid ester monomers, methyl methacrylate and n-butyl acrylate are preferable.

A suitable range for the proportion in which the (meth) acrylic acid ester monomer unit is included in the core polymer may differ depending on the proportion in which the previously described nitrile group-containing monomer unit is included in the core polymer, for example.

Firstly, in a case in which the proportion in which the nitrile group-containing monomer unit is included in the core polymer is 15 mass % or more with the amount of all repeating units in the organic particles taken to be 100 mass %, the proportion constituted by the (meth)acrylic acid ester monomer unit is preferably 5 mass % or more, and more preferably 23 mass % or more, and is preferably 50 mass % or less.

Moreover, in a case in which the proportion in which the nitrile group-containing monomer unit is included in the core polymer is less than 15 mass % with the amount of all repeating units in the organic particles taken to be 100 mass %, the proportion constituted by the (meth)acrylic acid ester monomer unit is preferably 55 mass % or more, more preferably 65 mass % or more, and even more preferably 70 mass % or more, and is preferably 90 mass % or less, more preferably 85 mass % or less, and even more preferably 80 mass % or less.

—Other Monomer Units—

Examples of other monomer units that can be included in the core polymer include, but are not specifically limited to, an acidic group-containing monomer unit and a cross-linkable monomer unit.

Examples of acidic group-containing monomers that can form the acidic group-containing monomer unit include the same acidic group-containing monomers as previously described in the "Binder" section. One of these acidic group-containing monomers may be used individually, or two or more of these acidic group-containing monomers may be used in combination. Of these acidic group-containing monomers, carboxy group-containing monomers and sulfo group-containing monomers are preferable, carboxy group-containing monomers are more preferable, and acrylic acid and methacrylic acid are even more preferable.

The proportion in which the acidic group-containing monomer unit is included in the core polymer when the amount of all repeating units in the organic particles is taken to be 100 mass % is preferably 0.1 mass % or more, and more preferably 0.5 mass % or more, and is preferably 6 mass % or less, and more preferably 5 mass % or less.

Examples of cross-linkable monomers that can form the cross-linkable monomer unit include the same cross-linkable monomers as previously described in the "Binder" section. One of these cross-linkable monomers may be used individually, or two or more of these cross-linkable monomers may be used in combination. Of these cross-linkable monomers, allyl (meth)acrylate, allyl glycidyl ether, and ethylene di(meth)acrylate are preferable.

The proportion in which the cross-linkable monomer unit is included in the core polymer when the amount of all repeating units in the organic particles is taken to be 100 mass % is preferably 0.1 mass % or more, and more preferably 0.5 mass % or more, and is preferably 10 mass % or less, and more preferably 2 mass % or less.

—Properties of Core Polymer—

The glass-transition temperature of the core polymer is preferably 0° C. or higher, more preferably 10° C. or higher, even more preferably 20° C. or higher, further preferably 30° C. or higher, particularly preferably 50° C. or higher, and most preferably 55° C. or higher, and is preferably 200° C. or lower, more preferably 150° C. or lower, even more preferably 130° C. or lower, further preferably 110° C. or lower, particularly preferably 100° C. or lower, and most preferably 90° C. or lower. When the glass-transition temperature of the core polymer is 0° C. or higher, sufficient peelability of the functional layer from the releasable substrate during transfer can be ensured, and blocking resistance when the laminate for a secondary battery is in the form of a roll for a secondary battery can be improved. On the other hand, when the glass-transition temperature of the core polymer is 200° C. or lower, adhesiveness of the functional layer to a substrate for a secondary battery during transfer can be further improved.

In the present disclosure, the "glass-transition temperature" of a core polymer can be measured by a method described in the EXAMPLES section of the present specification.

[Shell Portion]

A polymer that forms the shell portion (shell polymer) is not specifically limited, but preferably includes an aromatic monovinyl monomer unit. Moreover, the shell polymer may include monomer units other than the aromatic monovinyl monomer unit (i.e., other monomer units). Note that the shell portion normally has a different chemical composition to the core portion.

—Aromatic Monovinyl Monomer Unit—

Examples of aromatic monovinyl monomers that can form the aromatic monovinyl monomer unit include styrene, styrene sulfonic acid and salts thereof (for example, sodium styrenesulfonate), α-methylstyrene, vinyltoluene, and 4-(tert-butoxy)styrene. One of these aromatic monovinyl monomers may be used individually, or two or more of these aromatic monovinyl monomers may be used in combination. Of these aromatic monovinyl monomers, styrene and sodium styrenesulfonate are preferable, and styrene is particularly preferable.

The proportion in which the aromatic monovinyl monomer unit is included in the shell polymer when the amount of all repeating units in the organic particles is taken to be 100 mass % is preferably 10 mass % or more, and more preferably 15 mass % or more, and is preferably 35 mass % or less, and more preferably 30 mass % or less.

—Other Monomer Units—

Examples of other monomer units that can be included in the shell polymer include an acidic group-containing monomer unit, but are not specifically limited thereto.

Examples of acidic group-containing monomers that can form the acidic group-containing monomer unit include the same acidic group-containing monomers as previously described in the "Binder" section. One of these acidic group-containing monomers may be used individually, or two or more of these acidic group-containing monomers may be used in combination. Of these acidic group-containing monomers, carboxy group-containing monomers are preferable, and acrylic acid and methacrylic acid are more preferable.

The proportion in which the acidic group-containing monomer unit is included in the shell polymer when the amount of all repeating units in the organic particles is taken to be 100 mass % is preferably 0.1 mass % or more, and more preferably 0.5 mass % or more, and is preferably 3 mass % or less, and more preferably 2 mass % or less.

—Properties of Shell Polymer—

The glass-transition temperature of the shell polymer is preferably 70° C. or higher, and more preferably 80° C. or higher, and is preferably 150° C. or lower. When the glass-transition temperature of the shell polymer is 70° C. or higher, sufficient peelability of the functional layer from the releasable substrate during transfer can be ensured, and blocking resistance when the laminate for a secondary battery is in the form of a roll for a secondary battery can be improved. On the other hand, when the glass-transition temperature of the shell polymer is 150° C. or lower, adhesiveness of the functional layer to a substrate for a secondary battery during transfer can be further improved.

In the present disclosure, the "glass-transition temperature" of a shell polymer can be measured by a method described in the EXAMPLES section of the present specification.

[Production Method of Organic Particles]

Although no specific limitations are placed on the method by which the organic particles are produced, organic particles having the core-shell structure described above can be produced, for example, by stepwise polymerization in which one or more monomers for the core polymer and one or more monomers for the shell polymer are used, and in which the ratio of these monomers is changed over time. Specifically, the organic particles can be produced by continuous, multi-step emulsion polymerization or multi-step suspension polymerization in which a polymer formed in a preceding step is then covered by a polymer formed in a succeeding step.

The following describes one example of a case in which the organic particles having the core-shell structure are obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide or an azo compound such as 2,2'-azobis(2-methyl-N-(2-hydroxyethyl)propionamide) or 2,2'-azobis(2-amidinopropane) hydrochloride may, for example, be used as a polymerization initiator.

The polymerization procedure involves initially mixing one or more monomers for forming the core portion and the emulsifier, and then performing emulsion polymerization as one batch to obtain a particulate polymer that forms the core portion. The organic particles having the core-shell structure described above can then be obtained by performing polymerization of one or more monomers for forming the shell portion in the presence of the particulate polymer forming the core portion.

In this polymerization, it is preferable that the monomers for forming the shell polymer are supplied into the polymerization system continuously or divided into a plurality of portions from a viewpoint of partially covering the outer surface of the core portion with the shell portion. As a result of the monomers for forming the shell polymer being supplied into the polymerization system in portions or continuously, the polymer forming the shell portion can be formed as particles that bond to the core portion such as to form a shell portion that partially covers the core portion.

It tends to be easier to form a shell portion that partially covers the core portion when a monomer having low affinity with the polymerization solvent is used as a monomer for forming the shell polymer. Thus, in a situation in which the polymerization solvent is water, the one or more monomers used to form the shell polymer preferably include a hydrophobic monomer, and particularly preferably include an aromatic monovinyl monomer such as previously described.

Moreover, it tends to be easier to form a shell portion that partially covers the core portion when a smaller amount of emulsifier is used in polymerization for forming the shell portion. Accordingly, appropriate adjustment of the amount of emulsifier that is used can also enable formation of a shell portion that partially covers the core portion.

The volume-average particle diameter of the organic particles after formation of the shell portion can be set within a desired range by, for example, adjusting the amount of emulsifier, the amount of each monomer, and so forth.

[Volume-Average Particle Diameter of Organic Particles]

The volume-average particle diameter of the organic particles is preferably 0.1 μm or more, more preferably 0.2 μm or more, even more preferably 0.3 μm or more, particularly preferably 0.35 μm or more, and most preferably 0.4 μm or more, and is preferably 1 μm or less, more preferably 0.8 μm or less, even more preferably 0.7 μm or less, and particularly preferably 0.6 μm or less. When the volume-average particle diameter of the organic particles is 0.1 μm or more, peelability of the functional layer from the releasable substrate during transfer can be further improved, and adhesiveness of the functional layer to a substrate for a secondary battery during transfer can be further increased. On the other hand, when the volume-average particle diameter of the organic particles is 1 μm or less, adhesiveness of the functional layer to a substrate for a secondary battery during transfer can be further improved.

The "volume-average particle diameter" of organic particles referred to in the present disclosure can be measured by a method described in the EXAMPLES section of the present specification.

[Amount of Organic Particles]

In a case in which the functional layer contains organic particles, the amount of the organic particles in the functional layer per 100 parts by mass of the binder is preferably 100 parts by mass or more, more preferably 200 parts by mass or more, and even more preferably 300 parts by mass or more, and is preferably 1,000 parts by mass or less, more preferably 800 parts by mass or less, and even more preferably 700 parts by mass or less.

<Non-Conductive Particles>

The non-conductive particles that are optionally compounded in the functional layer are not specifically limited and may be any known non-conductive particles that are used in secondary batteries.

More specifically, although both inorganic fine particles and organic fine particles other than the previously described binder and organic particles can be used as the non-conductive particles, inorganic fine particles are normally used. The material of the non-conductive particles is preferably an electrochemically stable material that is present stably in the environment of use of a secondary battery. Examples of materials of the non-conductive particles that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination. The amount of the non-conductive particles in the functional layer can be adjusted as appropriate.

<<Other Components>>

The functional layer may contain any other components besides the components set forth above. Examples of these other components include known additives such as wetting agents, viscosity modifiers, and additives for electrolyte solution. One of these other components may be used individually, or two or more of these other components may be used in combination.

<Dotted Form>

The functional layer that contains the previously described binder and that optionally contains the previously described organic particles, non-conductive particles, and other components is formed in a dotted form on the surface A of the releasable substrate. In other words, the laminate for a secondary battery includes a plurality of regions (dots) where components of the functional layer, such as the binder, are present on the surface A of the releasable substrate, and also includes, in-between these dots, a region where components of the functional layer, such as the binder, are not present. FIGS. 2 and 3 schematically illustrate examples of the presently disclosed laminate for a secondary battery. In a laminate 200 for a secondary battery illustrated in each of FIGS. 2 and 3, dots 220 are regularly disposed on a releasable substrate 210. However, note that the dots 220 may be disposed irregularly on the releasable substrate 210.

No specific limitations are placed on the shape of the dots. For example, the cross-sectional shape when an individual dot is sectioned along a plane perpendicular to the releasable substrate may be any shape such as a square shape, a rectangular shape, a trapezoidal shape, or a shape resulting from upper edges of two trapezoids being in contact.

The method by which the dotted functional layer is obtained may be, but is not specifically limited to, a method in which the functional layer is formed on the releasable substrate in a dotted form by the presently disclosed "method of producing a laminate for a non-aqueous secondary battery" that is described further below.

The average diameter of the dots present on the releasable substrate is preferably 5 μm or more, and more preferably 20 μm or more, and is preferably 500 μm or less, and more preferably 300 μm or less. When the average diameter of the dots is 5 μm or more, a balance of even higher levels of peelability of the functional layer from the releasable substrate and adhesiveness of the functional layer to a substrate for a secondary battery can be achieved, and transferability of the functional layer can be significantly improved. On the other hand, metal deposition on an electrode can be significantly inhibited when the average diameter of the dots is 500 μm or less.

The average diameter of the dots can be adjusted by, for example, altering the contact angle with water of the surface A of the releasable substrate to which a composition for a functional layer is supplied during production of the laminate for a secondary battery. In a situation in which the composition for a functional layer is supplied onto the surface A of the releasable substrate as droplets by an inkjet method, for example, the average diameter of the dots can be adjusted by altering the size of the droplets, whereas in a situation in which the composition for a functional layer is supplied onto the surface A of the releasable substrate by a screen printing method, for example, the average diameter of the dots can be adjusted by altering the screen shape.

The "average diameter" of dots referred to in the present disclosure can be determined by a method described in the EXAMPLES section of the present specification.

The area occupied by the dots on the surface A of the releasable substrate as a proportion relative to the area of the surface A (=area of regions where dots are present/area of surface A of releasable substrate×100%) is preferably 10% or more, and more preferably 33% or more, and is preferably 78.5% or less, and more preferably 55% or less. When the area occupied by the dots as a proportion relative to the area of the surface A of the releasable substrate is within any of the ranges set forth above, it is possible to achieve a balance of high levels of peelability of the functional layer from the releasable substrate and adhesiveness of the functional layer to a substrate for a secondary battery when the functional layer is transferred to a component for a secondary battery to produce a battery component.

The area occupied by the dots as a proportion relative to the area of the surface A of the releasable substrate can be adjusted by, for example, altering the amount of the composition for a functional layer that is supplied onto the releasable substrate.

The "area occupied by dots as a proportion relative to the area of a surface A of a releasable substrate" referred to in the present disclosure can be determined by a method described in the EXAMPLES section of the present specification.

<Releasable Substrate>

The releasable substrate of the laminate for a secondary battery is a substrate including a surface A and a surface B at the opposite side to the surface A. The releasable substrate is preferably non-porous. In the laminate for a secondary battery, the functional layer set forth above is formed in a dotted form on the surface A of the releasable substrate. The releasable substrate can easily be peeled apart from the functional layer during transfer from the laminate for a secondary battery to a substrate for a secondary battery. No specific limitations are placed on the form (film, etc.) or the material (polyethylene terephthalate, polypropylene, etc.) of the releasable substrate and commonly known examples thereof may be adopted.

The surface A on which the functional layer is formed preferably has a smaller contact angle with water than the surface B. When the contact angle with water of the surface A is smaller than the contact angle with water of the surface B, blocking resistance of a roll for a secondary battery obtained by winding the laminate for a secondary battery can be improved.

The contact angle with water of the surface A of the releasable substrate is preferably 60° or more, more preferably 65° or more, and even more preferably 70° or more, and is preferably less than 110°, more preferably less than 100°, even more preferably less than 90°, and particularly preferably less than 80°. When the contact angle with water of the surface A is 60° or more, a functional layer formed from an aqueous composition for a functional layer, for example, does not excessively adhere to the releasable substrate, and peelability of the functional layer from the releasable substrate during transfer can be ensured. On the other hand, detachment of the dotted functional layer from the releasable substrate prior to transfer can be inhibited when the contact angle with water of the surface A is less than 110°.

The contact angle with water of the surface B of the releasable substrate is preferably 90° or more, more preferably 100° or more, and even more preferably 110° or more. When the contact angle with water of the surface B is 90° or more, blocking resistance of a roll for a secondary battery obtained by winding the laminate for a secondary battery can be improved. No specific limitations are placed on the upper limit for the contact angle with water of the surface B of the releasable substrate, and the contact angle with water of the surface B can be 180° or less.

The contact angle with water of the surface A and/or the surface B of the releasable substrate can be adjusted by a known method.

(Production Method of Laminate for Non-Aqueous Secondary Battery)

The method by which the functional layer is formed in a dotted form on the releasable substrate to produce the laminate for a secondary battery is preferably the presently disclosed method of producing a laminate for a non-aqueous secondary battery but is not specifically limited thereto.

Specifically, the presently disclosed method of producing a laminate for a secondary battery includes a step of supplying a composition for a non-aqueous secondary battery functional layer containing a binder and a solvent onto a surface A at one side of a releasable substrate (functional layer composition supply step) and a step of drying the composition for a non-aqueous secondary battery functional layer that has been supplied onto the surface A (drying step). In the presently disclosed production method, the contact angle with water of the surface A of the releasable substrate is 60° or more, and the supplied amount (in terms of solid content) of the composition for a functional layer to the surface A per unit area is not less than 0.05 $g/m^2$ and less than 0.8 $g/m^2$.

<Functional Layer Composition Supply Step>

In the functional layer composition supply step, a composition for a functional layer in the form of a slurry is supplied onto the surface A of the releasable substrate, which has a contact angle with water of 60° or more.

<<Composition for Functional Layer>>

The solvent contained in the composition for a functional layer is preferably xylene or water, but is not specifically limited thereto. Moreover, one solvent may be used individually, or two or more solvents may be used as a mixture. Components other than the solvent (water, etc.) that are contained in the composition for a functional layer can be selected so as to correspond to those contained in the previously described functional layer, and the preferred ratio of these components in the composition for a functional layer is the same as the preferred ratio thereof in the functional layer.

No specific limitations are placed on the method by which the composition for a functional layer is produced. For example, the composition for a functional layer can be produced by mixing a binder, a solvent, and also organic particles, non-conductive particles, and other components (wetting agent, etc.) that are used as necessary. Although the mixing can be carried out by any method, the mixing is normally carried out using a disperser as a mixer to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. A high-level disperser that can apply a high level of dispersing shear, such as a bead mill, a roll mill, or a FILMIX, may also be used.

<Releasable Substrate>>

The releasable substrate including a surface A having a contact angle with water of 60° or more may be the releasable substrate previously described in the "Laminate for non-aqueous secondary battery" section.

<<Supply of Composition for Functional Layer onto Releasable Substrate>>

Examples of methods by which the composition for a functional layer may be supplied onto the releasable substrate include, but are not specifically limited to, screen printing, gravure coating, inkjet coating, spray coating, doctor blading, reverse roll coating, direct roll coating, extrusion coating, brush coating, and dispenser coating. In a case in which surface release treatment is performed with respect to the surface A of the used releasable substrate in advance, setting the coating pattern of the surface release treatment material used in this treatment as a dotted form also enables use of a method such as dip coating. Of these methods, screen printing, gravure coating, and inkjet coating are preferable.

The supplied amount (in terms of solid content) of the composition for a functional layer onto the surface A of the releasable substrate per unit area is required to be not less than 0.05 g/m$^2$ and less than 0.8 g/m$^2$, is preferably 0.1 g/m$^2$ or more, and is preferably 0.5 g/m$^2$ or less, and more preferably 0.4 g/m$^2$ or less. The obtained functional layer can be caused to sufficiently display desired performance in terms of heat resistance, adhesiveness, or the like when the supplied amount per unit of the composition for a functional layer to the surface A is 0.05 g/m$^2$ or more, whereas diffusivity of charge carriers (lithium ions, etc.) in a secondary battery can be ensured and an increase in resistance due to the functional layer can be suppressed when the supplied amount per unit area is less than 0.8 g/m$^2$.

Moreover, when the supplied amount of the composition for a functional layer to the surface A per unit area is not less than 0.05 g/m$^2$ and less than 0.8 g/m$^2$, this enables good formation of a dotted functional layer on the releasable substrate through the subsequently described drying step.

<Drying Step>

In the drying step, the composition for a functional layer that has been supplied onto the releasable substrate in the functional layer composition supply step described above is dried to form a functional layer on the surface A of the releasable substrate.

The composition for a functional layer on the releasable substrate may be dried by any commonly known method without any specific limitations. For example, the drying may be carried out through drying by warm, hot, or low-humidity air; drying in a vacuum; or drying by irradiation with infrared light, electron beams, or the like. Although no specific limitations are placed on the drying conditions, the drying temperature is preferably not lower than 20° C. and not higher than 80° C., and the drying time is preferably not less than 10 seconds and not more than 10 minutes.

(Roll for Non-Aqueous Secondary Battery)

The presently disclosed roll for a non-aqueous secondary battery is obtained by winding the presently disclosed laminate for a non-aqueous secondary battery set forth above. Winding of the laminate for a secondary battery into the form of a roll for a secondary battery places the laminate for a secondary battery in a form that is suitable for transport or storage. Moreover, when the laminate for a secondary battery is fed from the presently disclosed roll for a secondary battery and is used for functional layer transfer onto a substrate for a secondary battery, the functional layer can easily be peeled from the releasable substrate while also being well adhered to the substrate for a secondary battery.

The method by which the laminate for a secondary battery is wound to obtain the roll for a secondary battery may be any known method without any specific limitations.

(Production Method of Non-Aqueous Secondary Battery Component)

The presently disclosed laminate for a non-aqueous secondary battery can be used to form a functional layer on a substrate for a non-aqueous secondary battery and thereby produce a non-aqueous secondary battery component (electrode or separator) including the functional layer. Specifically, the presently disclosed method of producing a secondary battery component includes a step of positioning the laminate for a secondary battery such that the functional layer is adjacent to a substrate for a secondary battery and adhering the functional layer to the substrate for a secondary battery (adhering step), and a step of peeling the releasable substrate from the functional layer (peeling step).

The presently disclosed method of producing a secondary battery component enables good production, through use of the presently disclosed laminate for a secondary battery, of a battery component that includes a functional layer formed in a dotted form and that is capable of sufficient close adherence to another battery component via the functional layer.

<Adhering Step>

No specific limitations are placed on the substrate for a secondary battery to which the functional layer is adhered in the adhering step. A separator substrate can be used as the substrate for a secondary battery in a situation in which a separator is to be produced as a secondary battery component, whereas an electrode substrate including an electrode mixed material layer formed on a current collector can be used as the substrate for a secondary battery in a situation in which an electrode is to be produced as a secondary battery component. Also note that the substrate for a secondary battery may be a separator substrate or an electrode substrate having a porous membrane layer at the surface thereof.

<<Separator Substrate>>

The separator substrate is normally a porous substrate. Examples of separator substrates that can be used include those described in JP 2012-204303 A, JP 2015-207547 A, and JP 2018-85347 A, for example, but are not specifically limited thereto.

Suitable examples of separator substrates include a separator substrate formed by a microporous membrane (microporous membrane separator substrate) and a separator substrate formed by a non-woven fabric (non-woven fabric separator substrate). The use of a non-woven fabric separator substrate is preferable from a viewpoint of improving injectability of electrolyte solution in secondary battery production.

A microporous membrane made of polyolefinic (polyethylene, polypropylene, polybutene, polyvinyl chloride, etc.) resin is preferable as a microporous membrane separator substrate because such a membrane can reduce the total thickness of the separator, which increases the ratio of electrode active material in a secondary battery, and consequently increases the capacity per volume.

Moreover, examples of non-woven fabric separator substrates that can be used include those described in JP 2015-207547 A and JP 2018-85347 A, mentioned above. A non-woven fabric made from polyester (polyethylene terephthalate, etc.) fibers is preferable as a non-woven fabric separator substrate from a viewpoint of having excellent tensile strength.

<<Electrode Substrate>>

The electrode substrate (positive/negative electrode substrate) is not specifically limited and may, for example, be an electrode substrate obtained by forming an electrode mixed material layer on a current collector.

The current collector, the components in the electrode mixed material layer (electrode active material (positive/negative electrode active material), binder for electrode mixed material layer (binder for positive/negative electrode mixed material layer), etc.), and the method by which the electrode mixed material layer is formed on the current collector may be known examples thereof such as any of those described in JP 2013-145763 A, for example.

<<Adhering Method>>

The method by which the functional layer of the laminate for a secondary battery is adhered to the substrate for a secondary battery in the adhering step is not specifically limited but is preferably pressure adhesion by mold pressing, roll pressing, or the like. The pressure adhesion conditions (pressure, temperature, time, etc.) can be altered as appropriate depending on the glass-transition temperature of a used binder or organic particles, for example.

For example, in a case in which the functional layer contains organic particles having a core-shell structure and in which Tgl is taken to be whichever is lower out of the glass-transition temperature of the core polymer of the organic particles and the glass-transition temperature of the shell polymer of the organic particles, the temperature of the functional layer during pressure adhesion is preferably not lower than $(Tgl-10)°$ C. and not higher than $(Tgl+30)°$ C., and more preferably not lower than $Tgl°$ C. and not higher than $(Tgl+10)°$ C. Moreover, particularly in a case in which a roll press is used, the roll temperature is preferably not lower than $(Tgl-10)°$ C. and not higher than $(Tgl+30)°$ C., and more preferably not lower than $Tgl°$ C. and not higher than $(Tgl+10)°$ C.

<Peeling Step>

No specific limitations are placed on the method by which the releasable substrate is peeled from the functional layer in the peeling step to obtain a secondary battery component including the functional layer on the substrate for a secondary battery, and any known method may be adopted.

(Non-Aqueous Secondary Battery)

A non-aqueous secondary battery that includes a secondary battery component produced through the presently disclosed method of producing a non-aqueous secondary battery component set forth above can display excellent battery characteristics because metal deposition on an electrode can be inhibited and strong close adherence between battery components is possible.

<Positive Electrode, Negative Electrode, and Separator>

At least one secondary battery component in the secondary battery is a secondary battery component produced by the presently disclosed method of producing a non-aqueous secondary battery component. In other words, at least one of a positive electrode, a negative electrode, and a separator used in the secondary battery includes a functional layer. Specifically, an electrode produced by forming an electrode mixed material layer on a current collector to form an electrode substrate and then providing a functional layer on the electrode substrate may be used as a positive electrode or negative electrode that includes a functional layer. Moreover, a separator produced by providing a functional layer on a separator substrate may be used as a separator that includes a functional layer. The electrode substrate and the separator substrate can be the same as any of those described in the "Production method of non-aqueous secondary battery component" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. For example, in a lithium ion secondary battery, the supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution other than being an organic solvent in which the supporting electrolyte can dissolve. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Moreover, a known additive such as vinylene carbonate (VC), fluoroethylene carbonate (FEC), or ethyl methyl sulfone may be added to the electrolyte solution.

<Production Method of Non-Aqueous Secondary Battery>

The secondary battery can be produced by, for example, stacking the positive electrode and the negative electrode with the separator in-between, performing rolling, folding, or the like of the resultant stack as necessary to place the stack in a battery container, injecting the electrolyte solution into the battery container, and sealing the battery container. At least one secondary battery component among the positive electrode, the negative electrode, and the separator is a secondary battery component produced by the presently disclosed method of producing a non-aqueous secondary battery component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted in the polymer by a repeating unit (monomer unit) that is formed through polymerization of a given monomer is normally, unless otherwise specified, the same as the ratio (charging ratio) of the given monomer among all monomers used in polymerization of the polymer.

In the examples and comparative examples, the following methods were used to evaluate the contact angle with water of a surface A and a surface B of a releasable substrate, the volume-average particle diameter of organic particles, the glass-transition temperature of each polymer (binder, core polymer, and shell polymer), the average diameter of dots, the area occupied by dots as a proportion relative to the area of a surface A of a releasable substrate or the like, the peelability from a releasable substrate, adhesiveness to a substrate for a secondary battery, and transferability (overall evaluation) of a functional layer, the close adherence strength between a negative electrode including a functional layer and a separator, the blocking resistance of a roll for a secondary battery, the state of lithium metal deposition on a negative electrode, and the injectability of electrolyte solution in secondary battery production.

<Contact Angle with Water>

A goniometer (DM-701 produced by Kyowa Interface Science Co., Ltd.) was used to drip 3 μL of distilled water onto a releasable substrate surface (each of a surface A and a surface B) and to measure the contact angle (°) 10 seconds after this dripping.

<Volume-Average Particle Diameter>

The volume-average particle diameter of organic particles was taken to be a particle diameter at which, in a particle diameter distribution measured with respect to a water dispersion adjusted to a solid content concentration of 15% using a laser diffraction particle diameter distribution analyzer (SALD-3100 produced by Shimadzu Corporation), cumulative volume calculated from the small diameter end of the distribution reached 50%.

<Glass-Transition Temperature>

With respect to each of a core polymer and a shell polymer, a monomer composition for producing the polymer was used to prepare a water dispersion containing the polymer as a measurement sample through the same polymerization conditions as used to produce the polymer, and the measurement sample obtained by drying this water dispersion was used in measurement of the glass-transition temperature of the polymer.

Moreover, a measurement sample obtained by drying an obtained water dispersion containing a binder was used as a measurement sample in measurement of the glass-transition temperature of the binder.

Next, a differential scanning calorimeter (produced by SII NanoTechnology Inc.; product name: EXSTAR DSC6220) was used to obtain a differential scanning calorimetry (DSC) curve by weighing 10 mg of the above-described measurement sample into an aluminum pan, and then carrying out measurement in a temperature range of −100° C. to 500° C. with a heating rate of 10° C./min and under conditions stipulated by JIS Z8703. An empty aluminum pan was used as a reference. In the heating process, the glass-transition temperature was determined from an intersection point of a base line directly before a heat absorption peak on the DSC curve at which a differential signal (DDSC) reached 0.05 mW/min/mg or more and a tangent to the DSC curve at a first inflection point to appear after the heat absorption peak.

<Average Diameter of Dots>

A functional layer on a releasable substrate (surface A) or a negative electrode mixed material layer was observed at ×1,000 magnification using a scanning electron microscope (SEM) "Hitachi S-4700", the maximum diameter of each of 50 randomly selected dots (largest length among lengths of line segments joining two points on the perimeter of a single dot) was measured, and an average value of the measured values was taken to be the average diameter of the dots.

<Area Occupied by Dots as Proportion Relative to Area of Surface A of Releasable Substrate, Etc.>

A functional layer on a releasable substrate (surface A) or a negative electrode mixed material layer was observed at ×100 magnification using an SEM "Hitachi S-4700" and 10 SEM images thereof were taken. With respect to the obtained images, the area occupied by dots was calculated as a proportion by the following calculation formula using image analysis software (analysis PRO produced by Olympus Corporation). An average value of the calculated values was taken to be the area occupied by the dots as a proportion relative to the area of the surface A or the like.

Proportion of area occupied by dots (%)=(Area of regions where dots are present/Area of field of view)×100

<Peelability of Functional Layer from Releasable Substrate>

The peelability of a functional layer from a releasable substrate was evaluated by measuring the adhesion strength between the functional layer and the releasable substrate as described below.

A rectangle of 100 mm in length and 10 mm in width was cut out from a laminate for a secondary battery including a releasable substrate and a functional layer to obtain a test specimen. The test specimen was placed with the functional layer facing downward and cellophane tape (tape prescribed by JIS Z1522) was affixed to the surface of the functional layer. One end of the releasable substrate was pulled vertically upward at a pulling speed of 50 mm/min to peel off the releasable substrate, and the stress during this peeling was measured. (Note that the cellophane tape was secured to a horizontal test stage.) This measurement was made three times and an average value of the stress was determined. The average value was taken to be the peel strength P1. A smaller measured peel strength P1 indicates better peelability of the functional layer from the releasable substrate.

A: Peel strength P1 of not less than 0.5 N/m and less than 15 N/m

B: Peel strength P1 of not less than 15 N/m and less than 20 N/m

C: Peel strength P1 of 20 N/m or more

<Adhesiveness of Functional Layer to Substrate for Secondary Battery>

The adhesiveness of a functional layer to a substrate for a secondary battery was evaluated by measuring the adhesion strength between the functional layer and a negative electrode substrate as described below.

A laminate for a secondary battery including a releasable substrate and a functional layer was positioned on a negative electrode substrate such that the functional layer and a negative electrode mixed material layer were in contact. The laminate for a secondary battery and the negative electrode substrate were passed through a roll press under conditions of a temperature of 70° C., a pressure of 2 MPa, and a speed of 20 m/min so as to paste the laminate for a secondary battery and the negative electrode substrate together. Thereafter, the releasable substrate was separated from the functional layer on a roll so as to transfer the functional layer to the negative electrode substrate. A rectangle of 100 mm in length and 10 mm in width was cut out from the resultant laminate of the functional layer and the negative electrode substrate as a test specimen. The test specimen was placed with the functional layer facing downward and cellophane tape (tape prescribed by JIS Z1522) was affixed to the surface of the functional layer. One end of the negative electrode substrate was pulled vertically upward at a pulling speed of 50 mm/min to peel off the negative electrode substrate, and the stress during this peeling was measured. (Note that the cellophane tape was secured to a horizontal test stage.) This measurement was made three times and an average value of the stress was determined. The average value was taken to be the peel strength P2. A larger measured peel strength P2 indicates better adhesiveness of the functional layer to the negative electrode substrate serving as a substrate for a secondary battery.

A: Peel strength P2 of 20 N/m or more

B: Peel strength P2 of not less than 15 N/m and less than 20 N/m

C: Peel strength P2 of not less than 10 N/m and less than 15 N/m

D: Peel strength P2 of not less than 5 N/m and less than 10 N/m

E: Peel strength P2 of less than 5 N/m

<Transferability of Functional Layer (Overall Evaluation)>

An evaluation was made by the following standard using a value (P2−P1) obtained by subtracting the peel strength P1 described above from the peel strength P2 described above. A larger value for P2−P1 indicates that a functional layer is more easily peeled from a releasable substrate and more easily adhered to a negative electrode substrate, and that the functional layer has better transferability.

A: P2−P1 is 1 N/m or more

B: P2−P1 is less than 1 N/m

<Close Adherence Strength Between Negative Electrode Including Functional Layer and Separator>

A functional layer was transferred from a laminate for a secondary battery to a negative electrode substrate by the same procedure as described in the "Adhesiveness of functional layer to substrate for secondary battery" section. The resultant laminate of the functional layer and the negative electrode substrate (negative electrode including a functional layer) was positioned on a separator (fine porous membrane separator substrate of 25 μm in thickness (2500 produced by Celgard, LLC.) used in Examples 1 to 3 and Comparative Examples 1 and 2; non-woven fabric separator substrate used in Examples 4 and 5) such that the functional layer was in contact with the separator. The negative electrode and the separator were passed through a roll press under conditions of a temperature of 70° C., a pressure of 2 MPa, and a speed of 20 m/min so as to paste the negative electrode and the separator together. A rectangle of 100 mm in length and 10 mm in width was cut out from the resultant laminate of the negative electrode and the separator to obtain a test specimen. The test specimen was placed with the separator facing downward and cellophane tape (tape prescribed by JIS Z1522) was affixed to the surface of the separator. One end of the negative electrode substrate was pulled vertically upward at a pulling speed of 50 mm/min to peel off the negative electrode substrate, and the stress during this peeling was measured. (Note that the cellophane tape was secured to a horizontal test stage.) This measurement was made three times and an average value of the stress was determined. The average value was taken to be the peel strength P3. A larger measured peel strength P3 indicates stronger close adherence of the separator and the negative electrode via the functional layer.

A: Peel strength P3 of 20 N/m or more

B: Peel strength P3 of not less than 15 N/m and less than 20 N/m

C: Peel strength P3 of not less than 10 N/m and less than 15 N/m

<Blocking Resistance>

The blocking resistance of a roll for a secondary battery was evaluated in a simulated manner as described below by preparing two laminates for a secondary battery and then observing the adhesion state thereof when the laminates were stacked and pressed such that a functional layer side of one of the laminates and a releasable substrate (surface B) side of the other of the laminates faced one another.

A first test specimen of 5 cm (width)×5 cm (length) and a second test specimen of 4 cm (width)×4 cm (length) were cut out from a laminate for a secondary battery including a releasable substrate and a functional layer. These two test specimens were stacked such that the functional layer of the first test specimen and the releasable substrate (surface B) of the second test specimen were in contact. A sample obtained through stacking of these two test specimens was placed under pressure of 10 g/cm$^2$ at 40° C. and was left under this pressure for 24 hours. The state of adhesion (blocking state) of the test specimens (laminates for a secondary battery) in the sample that had been left for 24 hours was observed by eye and was evaluated by the following standard.

A: Blocking of test specimens does not occur

B: Blocking of test specimens occurs but test specimens can be peeled apart

C: Blocking of test specimens occurs and test specimens cannot be peeled apart

<State of Lithium Metal Deposition>

The state of lithium metal deposition on a negative electrode during charging of a secondary battery was evaluated through observation under an optical microscope as described below.

Specifically, a lithium ion secondary battery (wound type) obtained after electrolyte solution injection during secondary battery production was left at rest in an environment having a temperature of 25° C. for 5 hours. The secondary battery that had been left at rest was subjected to an initial charge to a cell voltage of 3.65 V by a constant-current method at a charge rate of 0.2 C while in an environment having a temperature of 25° C. The initial-charged secondary battery was then subjected to 12 hours of aging in an environment having a temperature of 60° C. The secondary battery subjected to aging was discharged to a cell voltage of 3.00 V by a constant-current method at a rate of 0.2 C while in an environment having a temperature of 25° C., and in this manner initial charging and discharging were completed.

The secondary battery that had undergone this initial charging and discharging was then subjected to constant-current constant-voltage charging under conditions of a constant current at a rate of 0.2 C and an upper limit cell voltage of 4.30 V, and was further subjected to constant-current discharging under conditions of a constant current at a rate of 0.2 C and a lower limit cell voltage of 3.00 V.

The secondary battery that had been constant-current discharged was then subjected to 10 cycles of constant-current charging and discharging between cell voltages of 4.30 V and 3.00 V at a rate of 0.5 C while in an environment having a temperature of 25° C. Thereafter, the secondary battery was subjected to constant-current constant-voltage charging under conditions of a constant current at a rate of 0.5 C and an upper limit cell voltage of 4.30 V while in an environment having a temperature of 25° C.

The secondary battery was dismantled to remove the negative electrode in an argon (inert gas) atmosphere. The removed negative electrode was washed with diethyl carbonate. The surface of the washed negative electrode was observed using an optical microscope in order to evaluate the state of lithium metal deposition on the surface of the negative electrode by the following standard.

A: Lithium metal deposition on negative electrode surface not observed

B: Lithium metal deposition on negative electrode surface observed

<Injectability of Electrolyte Solution>

In production of a lithium ion secondary battery (laminate type), the minimum time required to inject the entire amount of electrolyte solution into an aluminum packing case without overflow thereof (i.e., the minimum injection time) was determined and was evaluated by the following standard. A shorter minimum injection time indicates better electrolyte solution injectability.

A: Minimum injection time of 100 s or less

B: Minimum injection time of more than 100 s and not more than 300 s

C: Minimum injection time of more than 300 s and not more than 500 s

D: Minimum injection time of more than 500 s

Example 1

<Preparation of Binder (Conjugated Diene Polymer)>
<<Solid Polybutadiene>>

BR1220 (product name; produced by ZEON CORPORATION) was prepared as solid polybutadiene. The glass-transition temperature of the solid polybutadiene was measured. The result is shown in Table 1.

<<Liquid Polybutadiene>>

LBR302 (product name; produced by Kuraray Co., Ltd.) was prepared as liquid polybutadiene. The glass-transition temperature of the liquid polybutadiene was measured. The result is shown in Table 1.

<Production of Composition for Functional Layer>

A composition for a functional layer was obtained by mixing 80 parts of solid polybutadiene and 20 parts of liquid polybutadiene as binders using a two-roll mill and adjusting the solid content concentration to 20% with xylene.

<Preparation of Releasable Substrate>

A releasable substrate having a total thickness of 25 μm was obtained by providing a surface A (hard release surface) that had been subjected to alkyd treatment as a surface at one side of a polyethylene terephthalate (PET) substrate and a surface B (easy release surface) that had been subjected to silicone surface treatment as a surface at the other side of the polyethylene terephthalate substrate. The contact angle with water of each of the surfaces A and B of the releasable substrate was measured. The results are shown in Table 1.

<Production of Laminate for Secondary Battery>

The composition for a functional layer described above was supplied onto the surface A (contact angle with water: 70°) of the releasable substrate by screen printing. The supplied amount (in terms of solid content) of the composition for a functional layer to the surface A per unit area was 0.1 g/m$^2$. The composition for a functional layer on the releasable substrate was dried at 50° C. for 3 minutes. In this manner, a laminate for a secondary battery including a functional layer formed in a dotted form on the surface A of the releasable substrate was obtained. The obtained laminate for a secondary battery was used to evaluate the average diameter of the dots and the area occupied by the dots as a proportion relative to the area of the surface A of the releasable substrate. The obtained laminate for a secondary battery was also used (together with the subsequently described negative electrode substrate) to evaluate peelability of the functional layer from the releasable substrate, adhesiveness of the functional layer to a substrate for a secondary battery, and transferability (overall evaluation) of the functional layer. Moreover, the obtained laminate for a secondary battery was used to evaluate blocking resistance of a roll for a secondary battery. The results are shown in Table 1.

<Production of Negative Electrode Substrate>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a particulate binder (SBR) for a negative electrode mixed material layer. The mixture containing the particulate binder was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing the target particulate binder.

Next, 100 parts of artificial graphite (volume-average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a thickener, and deionized water were mixed and adjusted to a solid content concentration of 68%, and were subsequently mixed at 25° C. for 60 minutes. Next, deionized water was used to adjust the solid content concentration to 62% and further mixing was performed at 25° C. for 15 minutes. Thereafter, 1.5 parts in terms of solid content of the water dispersion containing the particulate binder described above and deionized water were added to the resultant mixture, the final solid content concentration was adjusted to 52%, and a further 10 minutes of mixing was performed.

The resultant mixture was subjected to a defoaming process under reduced pressure to yield a slurry composition for a negative electrode having good fluidity.

A comma coater was used to apply the slurry composition for a negative electrode obtained as described above onto copper foil of 20 μm in thickness, used as a current collector, such as to have a thickness of approximately 150 μm after drying. The applied slurry composition was dried by conveying the copper foil inside a 60° C. oven for 2 minutes at a speed of 0.5 m/min. Thereafter, heat treatment was performed at 120° C. for 2 minutes to obtain a pre-pressing negative electrode web. The pre-pressing negative electrode web was rolled by roll pressing to obtain a post-pressing negative electrode substrate having a negative electrode mixed material layer thickness of 80 μm.

<Production of Negative Electrode Including Functional Layer (Transfer of Functional Layer to Negative Electrode Substrate)>

The laminate for a secondary battery including the releasable substrate and the functional layer was positioned on the negative electrode substrate such that the functional layer was in contact with the negative electrode mixed material layer and was passed through a roll press having a temperature of 25° C. so as to paste the laminate for a secondary battery and the negative electrode substrate together. Thereafter, the releasable substrate was peeled from the functional layer on a roll to transfer the functional layer onto the negative electrode substrate and thereby obtain a negative electrode including a functional layer formed in a dotted form on the negative electrode substrate. The temperature of the functional layer during roll pressing was 25° C. The obtained negative electrode was used to evaluate close adherence strength between the negative electrode including the functional layer and a separator. The result is shown in Table 1.

<Production of Positive Electrode>

A slurry composition for a positive electrode was produced by combining 100 parts of $LiCoO_2$ (volume-average particle diameter: 12 μm) as a positive electrode active material, 2 parts of acetylene black (HS-100 produced by Denki Kagaku Kogyo Kabushiki Kaisha) as a conductive material, 2 parts in terms of solid content of polyvinylidene fluoride (#7208 produced by Kureha Corporation) as a particulate binder for a positive electrode mixed material layer, and N-methylpyrrolidone such as to have a total solid content concentration of 70% and mixing these materials in a planetary mixer.

A comma coater was used to apply the obtained slurry composition for a positive electrode onto aluminum foil of 20 μm in thickness, used as a current collector, such as to have a thickness of approximately 150 μm after drying. The applied slurry composition was dried by conveying the aluminum foil inside a 60° C. oven for 2 minutes at a speed of 0.5 m/min. Thereafter, heat treatment was performed at 120° C. for 2 minutes to obtain a positive electrode web. The pre-pressing positive electrode web was rolled by roll pressing to obtain a post-pressing positive electrode having a positive electrode mixed material layer thickness of 80 μm.

<Production of Lithium Ion Secondary Battery (Wound Type)>

The post-pressing positive electrode obtained as described above was cut out as 49 cm×5 cm and was placed with the surface at the positive electrode mixed material layer side facing upward, and a separator (2500 produced by Celgard, LLC.; thickness: 25 μm) that had been cut out as 55 cm×5.5 cm was positioned thereon. In addition, the negative electrode including a functional layer that was obtained as described above was cut out as 50 cm×5.2 cm and was positioned on the separator such that the surface at the functional layer side faced toward the separator. The resultant product was wound by a winding machine to obtain a roll for a secondary battery. The roll for a secondary battery was pressed into a flattened form at 60° C. and 0.5 MPa and was enclosed in an aluminum packing case serving as a battery case. Electrolyte solution (solvent: EC/DEC/VC (volume mixing ratio)=68.5/30/1.5; electrolyte: $LiPF_6$ of 1 M in concentration) was injected such that no air remained. The aluminum packing case was closed by heat sealing at 150° C. so as to seal an opening of the aluminum packing case and thereby produce a lithium ion secondary battery (wound type) having a discharge capacity of 1,000 mAh as a non-aqueous secondary battery.

The obtained lithium ion secondary battery (wound type) was used to evaluate the state of lithium metal deposition on the negative electrode. The result is shown in Table 1.

<Production of Lithium Ion Secondary Battery (Laminate Type)>

The post-pressing positive electrode obtained as described above was cut out as 49 cm×5 cm and was placed with the surface at the positive electrode mixed material layer side facing upward, and a separator (2500 produced by Celgard, LLC.; thickness: 25 μm) that had been cut out as 55 cm×5.5 cm was positioned thereon. In addition, the negative electrode including a functional layer that was obtained as described above was cut out as 50 cm×5.2 cm and was positioned on the separator such that the surface at the functional layer side faced toward the separator so as to obtain an electrode laminate. The electrode laminate was enclosed in an aluminum packing case serving as a battery case. Electrolyte solution (solvent: EC/DEC/VC (volume mixing ratio)=68.5/30/1.5; electrolyte: $LiPF_6$ of 1 M in concentration) was injected such that no air remained. The aluminum packing case was then closed by heat sealing at 150° C. so as to seal an opening of the aluminum packing case and thereby produce a lithium ion secondary battery (laminate type) having a capacity of 800 mAh. Electrolyte solution injectability was evaluated during production of the lithium ion secondary battery (laminate type). The result is shown in Table 1.

Example 2

<Production of Binder (Acrylic Polymer)>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase of the reactor was purged with nitrogen gas and the temperature was raised to 60° C.

A monomer composition was obtained in a separate vessel by mixing 50 parts of deionized water, 0.5 parts of sodium dodecylbenzenesulfonate as a dispersant, 94 parts of butyl acrylate as a (meth)acrylic acid ester monomer, 2 parts of acrylonitrile as a nitrile group-containing monomer, 2 parts of methacrylic acid as an acidic group-containing monomer, and 1 part of N-methylolacrylamide and 1 part of allyl glycidyl ether as cross-linkable monomers. The monomer composition was continuously added to the reactor over 4 hours to effect polymerization. The reaction was carried out at 60° C. during the addition. After this addition, the contents of the reactor were stirred at 70° C. for a further 3 hours to complete the reaction and yield a water dispersion containing a particulate binder (acrylic polymer). The glass-transition temperature of the obtained binder was measured. The result is shown in Table 1.

<Production of Organic Particles>

A 5 MPa pressure vessel equipped with a stirrer was charged with 50 parts of methyl methacrylate and 25 parts of n-butyl acrylate as (meth)acrylic acid ester monomers, 1 part of allyl methacrylate as a cross-linkable monomer, 4 parts of methacrylic acid as an acidic group-containing monomer, 1 part of sodium dodecylbenzenesulfonate as an emulsifier, 150 parts of deionized water, and 0.5 parts of potassium persulfate as a polymerization initiator for formation of a core portion of organic particles. These materials were sufficiently stirred and were then heated to 60° C. to initiate polymerization. A mixture of 19 parts of styrene as an aromatic monovinyl monomer and 1 part of methacrylic acid as an acidic group-containing monomer was continuously added for formation of a shell portion of the organic particles once the polymerization conversion rate reached 96%, and the temperature was raised to 70° C. to continue polymerization. The reaction was terminated by cooling at the point at which the polymerization conversion rate of all added monomers reached 96% to yield a water dispersion containing organic particles. The organic particles were confirmed to have a core-shell structure in which a shell portion partially covered the outer surface of a core portion.

The volume-average particle diameter of the obtained organic particles was measured. Moreover, the glass-transition temperatures of the polymers forming the organic particles were measured. The results are shown in Table 1.

<Production of Composition for Functional Layer>

A composition for a functional layer was obtained by mixing 100 parts in terms of solid content of the water dispersion containing the acrylic polymer as a binder and 476 parts in terms of solid content of the water dispersion containing the organic particles, and further adding deionized water to adjust the solid content concentration to 2%.

<Preparation of Releasable Substrate>

A releasable substrate was prepared in the same way as in Example 1.

<Production of Laminate for Secondary Battery>

The composition for a functional layer described above was supplied onto the surface A (contact angle with water: 70°) of the releasable substrate by gravure coating. The supplied amount (in terms of solid content) of the composition for a functional layer to the surface A per unit area was 0.1 g/m². The composition for a functional layer on the releasable substrate was dried at 50° C. for 3 minutes. In this manner, a laminate for a secondary battery including a functional layer formed in a dotted form on the surface A of the releasable substrate was obtained. The obtained laminate for a secondary battery was used to perform various evaluations in the same way as in Example 1. The results are shown in Table 1.

<Production of Negative Electrode Substrate, Negative Electrode Including Functional Layer, Positive Electrode, and Lithium Ion Secondary Battery>

A negative electrode substrate, a negative electrode including a functional layer, a positive electrode, and lithium ion secondary batteries (wound type and laminate type) were produced and various evaluations were performed in the same way as in Example 1 with the exception that the laminate for a secondary battery obtained as described above was used and the roll pressing temperature in production of the negative electrode including a functional layer (i.e., in transfer of the functional layer to the negative electrode substrate) was adjusted such that the temperature of the functional layer during roll pressing was changed to 65° C. The results are shown in Table 1.

Example 3

<Production of Binder, Organic Particles, and Composition for Functional Layer>

A binder, organic particles, and a composition for a functional layer were produced and various evaluations were performed in the same way as in Example 2. The results are shown in Table 1.

<Preparation of Releasable Substrate>

A releasable substrate having a total thickness of 26 μm was obtained by providing a surface A (hard release surface) that had been subjected to alkyd treatment as a surface at one side of a polyethylene terephthalate (PET) substrate and a surface B (easy release surface) that had been subjected to silicone surface treatment as a surface at the other side of the polyethylene terephthalate substrate. The contact angle with water of each of the surfaces A and B of the releasable substrate was measured. The results are shown in Table 1.

<Production of Laminate for Secondary Battery>

The composition for a functional layer described above was supplied onto the surface A (contact angle with water: 70°) of the releasable substrate by inkjet coating. The supplied amount (in terms of solid content) of the composition for a functional layer to the surface A per unit area was 0.1 g/m². The composition for a functional layer on the releasable substrate was dried at 50° C. for 3 minutes. In this manner, a laminate for a secondary battery including a functional layer formed in a dotted form on the surface A of the releasable substrate was obtained. The obtained laminate for a secondary battery was used to perform various evaluations in the same way as in Example 1. The results are shown in Table 1.

<Production of Negative Electrode Substrate, Negative Electrode Including Functional Layer, Positive Electrode, and Lithium Ion Secondary Battery>

A negative electrode substrate, a negative electrode including a functional layer, a positive electrode, and lithium ion secondary batteries (wound type and laminate type) were produced and various evaluations were performed in the same way as in Example 2 with the exception that the laminate for a secondary battery obtained as described above was used. The results are shown in Table 1.

Example 4

<Production of Binder and Composition for Functional Layer>

A binder and a composition for a functional layer were produced and various evaluations were performed in the same way as in Example 1. The results are shown in Table 1.

<Preparation of Releasable Substrate>

A releasable substrate was prepared and various evaluations were performed in the same way as in Example 1. The results are shown in Table 1.

<Production of Laminate for Secondary Battery>

The composition for a functional layer described above was supplied onto the surface A (contact angle with water: 70°) of the releasable substrate by inkjet coating. The supplied amount (in terms of solid content) of the composition for a functional layer to the surface A per unit area was 0.1 g/m². The composition for a functional layer on the releasable substrate was dried at 50° C. for 3 minutes. In this manner, a laminate for a secondary battery including a functional layer formed in a dotted form on the surface A of the releasable substrate was obtained. The obtained laminate for a secondary battery was used to perform various evaluations in the same way as in Example 1. The results are shown in Table 1.

<Production of Separator>

A homogeneous slurry for paper-making of 1% in concentration was produced by dispersing 40 parts of oriented crystallized polyethylene terephthalate (PET) short fibers having a fineness of 0.06 dtex (average fiber diameter: 2.4 μm) and a fiber length of 3 mm, 20 parts of oriented crystallized PET short fibers having a fineness of 0.1 dtex (average fiber diameter: 3.0 μm) and a fiber length of 3 mm, and 40 parts of single component-type binder PET short fibers (softening point: 120° C.; melting point: 230° C.) having a fineness of 0.2 dtex (average fiber diameter: 4.3 μm) and a fiber length of 3 mm in water using a pulper. The slurry for paper-making was wet laid on a tilted paper-making machine in which paper-making wires (structure: plain weave upper net and ribbed weave lower net) having an air permeability of 275 cm$^3$/cm$^2$/sec were installed, and the binder PET short fibers were caused to adhere and display non-woven fabric strength using a 135° C. cylinder dryer to obtain a non-woven fabric having a basis weight of 12 g/m$^2$. The non-woven fabric was subjected to thermal calendering under conditions of a hot roll temperature of 200° C., a line pressure of 100 kN/m, and a processing rate of 30 m/min using a one nip-type thermal calendering machine including a dielectric heating jacket roll (hot roll made from metal) and an elastic roll so as to produce a separator (non-woven fabric separator substrate) of 18 μm in thickness.

<Production of Negative Electrode Substrate>

A negative electrode substrate was produced in the same way as in Example 1.

<Production of Negative Electrode Including Functional Layer (Transfer of Functional Layer to Negative Electrode Substrate)>

The laminate for a secondary battery including the releasable substrate and the functional layer was positioned on the negative electrode substrate such that the functional layer was in contact with the negative electrode mixed material layer and was passed through a roll press having a temperature of 25° C. so as to paste the laminate for a secondary battery and the negative electrode substrate together. Thereafter, the releasable substrate was peeled from the functional layer on a roll to transfer the functional layer to the negative electrode substrate and thereby obtain a negative electrode including a functional layer formed in a dotted form on the negative electrode substrate. The temperature of the functional layer during roll pressing was 25° C. The obtained negative electrode was used to evaluate close adherence strength between the negative electrode including the functional layer and the separator. The results are shown in Table 1.

<Production of Positive Electrode and Lithium Ion Secondary Battery>

A positive electrode and lithium ion secondary batteries (wound type and laminate type) were produced and various evaluations were performed in the same way as in Example 1 with the exception that the separator (non-woven fabric separator substrate) and the negative electrode including a functional layer that were obtained as described above were used. The results are shown in Table 1.

Example 5

<Production of Binder and Composition for Functional Layer>

A binder and a composition for a functional layer were produced and various evaluations were performed in the same way as in Example 1. The results are shown in Table 1.

<Preparation of Releasable Substrate>

A releasable substrate was prepared and various evaluations were performed in the same way as in Example 1. The results are shown in Table 1.

<Production of Laminate for Secondary Battery>

The composition for a functional layer described above was supplied onto the surface A (contact angle with water: 70°) of the releasable substrate by gravure coating. The supplied amount (in terms of solid content) of the composition for a functional layer to the surface A per unit area was 0.4 g/m$^2$. The composition for a functional layer on the releasable substrate was dried at 50° C. for 3 minutes. In this manner, a laminate for a secondary battery including a functional layer formed in a dotted form on the surface A of the releasable substrate was obtained. The obtained laminate for a secondary battery was used to perform various evaluations in the same way as in Example 1. The results are shown in Table 1.

<Production of Separator>

A separator (non-woven fabric separator substrate) was produced in the same way as in Example 4.

<Production of Negative Electrode Substrate>

A negative electrode substrate was produced in the same way as in Example 1.

<Production of Negative Electrode Including Functional Layer (Transfer of Functional Layer to Negative Electrode Substrate)>

The laminate for a secondary battery including the releasable substrate and the functional layer was positioned on the negative electrode substrate such that the functional layer was in contact with the negative electrode mixed material layer and was passed through a roll press having a temperature of 25° C. so as to paste the laminate for a secondary battery and the negative electrode substrate together. Thereafter, the releasable substrate was peeled from the functional layer on a roll to transfer the functional layer to the negative electrode substrate and thereby obtain a negative electrode including a functional layer formed in a dotted form on the negative electrode substrate. The temperature of the functional layer during roll pressing was 25° C. The obtained negative electrode was used to evaluate close adherence strength between the negative electrode including the functional layer and the separator. The results are shown in Table 1.

<Production of Positive Electrode and Lithium Ion Secondary Battery>

A positive electrode and lithium ion secondary batteries (wound type and laminate type) were produced and various evaluations were performed in the same way as in Example 1 with the exception that the separator (non-woven fabric separator substrate) and the negative electrode including a functional layer that were obtained as described above were used. The results are shown in Table 1.

Comparative Example 1

A binder, organic particles, a releasable substrate, a laminate for a secondary battery, a negative electrode substrate, and a negative electrode including a functional layer were produced, a positive electrode and lithium ion secondary batteries were prepared, and various evaluations were performed in the same way as in Example 2 with the exception that in production of the laminate for a secondary battery, the supplied amount (in terms of solid content) of the composition for a functional layer to the surface A per unit area was changed to 0.8 g/m² and a functional layer was formed over the entirety of the surface A of the releasable substrate. The results are shown in Table 1.

Comparative Example 2

<Production of Binder (Acrylic Polymer), Organic Particles, and Composition for Functional Layer>

A binder (acrylic polymer), organic particles, and a composition for a functional layer were produced in the same way as in Example 2.

<Production of Negative Electrode Including Functional Layer>

A negative electrode substrate was produced in the same way as in Example 1. The composition for a functional layer described above was supplied onto the negative electrode mixed material layer of the obtained negative electrode substrate by inkjet coating. The supplied amount (in terms of solid content) of the composition for a functional layer onto the negative electrode mixed material layer per unit area was 0.1 g/m². The composition for a functional layer on the negative electrode mixed material layer was dried at 50° C. for 3 minutes. In this manner, a negative electrode including a functional layer formed in a dotted form on the negative electrode mixed material layer of the negative electrode substrate was obtained. The obtained negative electrode was used to evaluate close adherence strength between the negative electrode including the functional layer and a separator. The results are shown in Table 1.

<Production of Positive Electrode and Lithium Ion Secondary Battery>

A positive electrode and lithium ion secondary batteries were produced in the same way as in Example 1 with the exception that the negative electrode including a functional layer that was obtained as described above was used. An obtained lithium ion secondary battery was used to evaluate the state of lithium metal deposition on the negative electrode. The results are shown in Table 1.

In Table 1, shown below:
"MMA" indicates methyl methacrylate unit;
"BA" indicates n-butyl acrylate unit;
"AMA" indicates allyl methacrylate unit;
"MAA" indicates methacrylic acid unit;
"ST" indicates styrene unit;
"PB" indicates polybutadiene;
"AN" indicates acrylonitrile unit;
"AGE" indicates allyl glycidyl ether unit; and
"NMA" indicates N-methylolacrylamide unit.

TABLE 1

| | | | | | Example 1 | Example 2 | Example 3 | Example 4 |
|---|---|---|---|---|---|---|---|---|
| Supply target of composition for functional layer | | | | | Releasable substrate | Releasable substrate | Releasable substrate | Releasable substrate |
| Releasable substrate | Surface A | Contact angle with water (°) | | | 70 | 70 | 70 | 70 |
| | Surface B | Contact angle with water (°) | | | 120 | 120 | 110 | 120 |
| Functional layer | Organic particles | Chemical composition [mass %] | Core portion | MMA | — | 50 | 50 | — |
| | | | | BA | — | 25 | 25 | — |
| | | | | AMA | — | 1 | 1 | — |
| | | | | MAA | — | 4 | 4 | — |
| | | | Shell portion | ST | — | 19 | 19 | — |
| | | | | MAA | — | 1 | 1 | — |
| | | Volume-average particle diameter [μm] | | | — | 0.5 | 0.5 | — |
| | | Glass-transition temperature [° C.] | Core portion | | — | 60 | 60 | — |
| | | | Shell portion | | — | 110 | 110 | — |
| | | Amount per 100 parts by mass of binder [parts by mass] | | | — | 476 | 476 | — |
| | Binder | Conjugated diene polymer | Type | | Solid PB | — | — | Solid PB |
| | | | Glass-transition temperature [° C.] | | −85 | — | — | −85 |
| | | | Type | | Liquid PB | — | — | Liquid PB |
| | | | Glass-transition temperature [° C.] | | −85 | — | — | −85 |
| | | | Solid PB/(Solid PB + Liquid PB) [mass %] | | 80 | — | — | 80 |
| | | Acrylic polymer | Chemical composition [mass %] | BA | — | 94 | 94 | — |
| | | | | AN | — | 2 | 2 | — |
| | | | | MAA | — | 2 | 2 | — |
| | | | | AGE | — | 1 | 1 | — |
| | | | | NMA | — | 1 | 1 | — |
| | | | Glass-transition temperature [° C.] | | — | −32 | −32 | — |
| Average diameter of dots [μm] | | | | | 50 | 50 | 50 | 70 |
| Area occupied by dots as proportion relative to area of surface A of releasable substrate, etc. [%] | | | | | 33 | 33 | 33 | 33 |
| Supply method of composition for functional layer | | | | | Screen printing | Gravure coating | Inkjet | Inkjet |
| Supplied amount (in terms of solid content) of composition for functional layer [g/m²] | | | | | 0.1 | 0.1 | 0.1 | 0.1 |

TABLE 1-continued

| | | | | | | |
|---|---|---|---|---|---|---|
| Temperature of functional layer during functional layer transfer [° C.] | | | 25 | 65 | 65 | 25 |
| Separator | | | Microporous membrane | Microporous membrane | Microporous membrane | Non-woven fabric |
| Evaluation | Laminate | Blocking resistance | A | A | B | A |
| | | Peelability from releasable substrate [P1] | A | A | A | A |
| | | Adhesiveness to substrate for secondary battery [P2] | A | A | A | A |
| | | Transferability (overall evaluation) [P2 – P1] | A | A | A | A |
| | Functional layer | Close adherence strength [P3] | A | B | B | A |
| | Secondary battery | Injectability of electrolyte solution during production | B | B | B | A |
| | | State of lithium metal deposition on negative electrode | A | A | A | A |

| | | | | | Example 5 | Comparative Example 1 | Comparative Example 2 |
|---|---|---|---|---|---|---|---|
| | Supply target of composition for functional layer | | | | Releasable substrate | Releasable substrate | Negative electrode substrate |
| Releasable substrate | Surface A | Contact angle with water (°) | | | 70 | 70 | — |
| | Surface B | Contact angle with water (°) | | | 120 | 120 | — |
| Functional layer | Organic particles | Chemical composition [mass %] | Core portion | MMA | — | 50 | 50 |
| | | | | BA | — | 25 | 25 |
| | | | | AMA | — | 1 | 1 |
| | | | | MAA | — | 4 | 4 |
| | | | Shell portion | ST | — | 19 | 19 |
| | | | | MAA | — | 1 | 1 |
| | | Volume-average particle diameter [μm] | | | — | 0.5 | 0.5 |
| | | Glass-transition temperature [° C.] | Core portion | | — | 60 | 60 |
| | | | Shell portion | | — | 110 | 110 |
| | | Amount per 100 parts by mass of binder [parts by mass] | | | — | 476 | 476 |
| | Binder | Conjugated diene polymer | Type | | Solid PB | — | — |
| | | | Glass-transition temperature [° C.] | | −85 | — | — |
| | | | Type | | Liquid PB | — | — |
| | | | Glass-transition temperature [° C.] | | −85 | — | — |
| | | | Solid PB/(Solid PB + Liquid PB) [mass %] | | 80 | — | — |
| | | Acrylic polymer | Chemical composition [mass %] | BA | — | 94 | 94 |
| | | | | AN | — | 2 | 2 |
| | | | | MAA | — | 2 | 2 |
| | | | | AGE | — | 1 | 1 |
| | | | | NMA | — | 1 | 1 |
| | | | Glass-transition temperature [° C.] | | — | −32 | −32 |
| | Average diameter of dots [μm] | | | | 300 | — | 50 |
| | Area occupied by dots as proportion relative to area of surface A of releasable substrate, etc. [%] | | | | 55 | 100 | 33 |
| | Supply method of composition for functional layer | | | | Gravure coating | Gravure coating | Inkjet |
| | Supplied amount (in terms of solid content) of composition for functional layer [g/m²] | | | | 0.4 | 0.8 | 0.1 |
| Temperature of functional layer during functional layer transfer [° C.] | | | | | 25 | 65 | — |
| Separator | | | | | Non-woven fabric | Microporous membrane | Microporous membrane |
| Evaluation | Laminate | Blocking resistance | | | A | A | — |
| | | Peelability from releasable substrate [P1] | | | A | A | — |
| | | Adhesiveness to substrate for secondary battery [P2] | | | A | A | — |
| | | Transferability (overall evaluation) [P2 – P1] | | | A | B | — |

TABLE 1-continued

| | | | | | |
|---|---|---|---|---|---|
| Functional layer | Close adherence strength [P3] | | A | A | C |
| Secondary battery | Injectability of electrolyte solution during production | | A | B | B |
| | State of lithium metal deposition on negative electrode | | A | B | A |

It can be seen from Table 1 that when the laminate for a secondary battery of each of Examples 1 to 5, which includes a functional layer formed in a dotted form on a surface A of a releasable substrate, is used to transfer a functional layer onto a negative electrode substrate, the functional layer can be favorably peeled from the releasable substrate of the transfer source and strongly adhered to the negative electrode substrate of the transfer destination, and excellent transferability can be ensured. It can also be seen that strong close adherence between the negative electrode and a separator can be achieved through the functional layer that is transferred onto the negative electrode substrate. Also, it can be seen that when the negative electrode including the functional layer formed through transfer of the laminate for a secondary battery is used, deposition of lithium metal on the negative electrode can be sufficiently inhibited. Furthermore, when the laminate for a secondary battery is wound to produce a roll for a secondary battery, blocking resistance of the roll for a secondary battery can be sufficiently improved.

On the other hand, it can be seen that when the laminate for a secondary battery of Comparative Example 1, which includes a functional layer formed over the entirety of a surface A of a releasable substrate, is used to transfer a functional layer to a negative electrode substrate, the functional layer cannot be favorably peeled from the releasable substrate of the transfer source, and transferability is lost.

Moreover, it can be seen from Table 1 that in Comparative Example 2 in which a negative electrode obtained by directly forming a dotted functional layer on a negative electrode substrate is used, sufficient close adherence between the negative electrode and a separator cannot be achieved through the functional layer.

INDUSTRIAL APPLICABILITY

According to the present disclosure, it is possible to provide a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery, and also to provide a roll for a non-aqueous secondary battery obtained by winding this laminate for a non-aqueous secondary battery.

Moreover, according to the present disclosure, it is possible to provide a method of producing a laminate for a non-aqueous secondary battery that, in transfer of a functional layer onto a substrate for a non-aqueous secondary battery, enables easy peeling of the functional layer from a releasable substrate while also enabling good adhesion of the functional layer to the substrate for a non-aqueous secondary battery.

Furthermore, according to the present disclosure, it is possible to provide a method that enables good transfer of a functional layer onto a substrate for a non-aqueous secondary battery from a laminate for a non-aqueous secondary battery to produce a non-aqueous secondary battery component that is capable of sufficient close adherence to another battery component.

REFERENCE SIGNS LIST 100 organic particle
110 core portion
110S outer surface of core portion
120 shell portion
200 laminate for non-aqueous secondary battery
210 releasable substrate
220 dot (functional layer)

The invention claimed is:

1. A laminate for a non-aqueous secondary battery comprising: a releasable substrate; and a functional layer containing a binder, wherein
   the functional layer is formed in a dotted form on a surface A at one side of the releasable substrate,
   a contact angle with water of the surface A of the releasable substrate is 60° or more and less than 110°, and
   a contact angle with water of a surface B at an opposite side of the releasable substrate to the surface A is 120° or more and 180° or less.

2. A roll for a non-aqueous secondary battery obtained by winding the laminate for a non-aqueous secondary battery according to claim 1.

3. A method of producing a non-aqueous secondary battery component including a functional layer on a substrate for a non-aqueous secondary battery, comprising:
   positioning the laminate for a non-aqueous secondary battery according to claim 1 such that the functional layer is adjacent to the substrate for a non-aqueous secondary battery and adhering the functional layer to the substrate for a non-aqueous secondary battery; and
   peeling the releasable substrate from the functional layer.

* * * * *